United States Patent
Albinger et al.

(10) Patent No.: US 12,078,367 B2
(45) Date of Patent: Sep. 3, 2024

(54) HVAC SYSTEM WITH WATERSIDE AND AIRSIDE DISTURBANCE REJECTION

(71) Applicant: Johnson Controls Technology Company, Auburn Hills, MI (US)

(72) Inventors: Donald R. Albinger, New Berlin, WI (US); Kirk H. Drees, Cedarburg, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 96 days.

(21) Appl. No.: 16/204,952

(22) Filed: Nov. 29, 2018

(65) Prior Publication Data

US 2019/0162436 A1    May 30, 2019

Related U.S. Application Data

(60) Provisional application No. 62/592,910, filed on Nov. 30, 2017.

(51) Int. Cl.
  *F24F 11/32*    (2018.01)
  *F24F 11/74*    (2018.01)
  (Continued)

(52) U.S. Cl.
  CPC ............ *F24F 11/32* (2018.01); *F24F 11/74* (2018.01); *F24F 11/84* (2018.01); *F24F 11/89* (2018.01);
  (Continued)

(58) Field of Classification Search
  CPC .. F24F 11/32; F24F 11/74; F24F 11/84; F24F 2110/40; F24F 11/65; F24F 2140/40
  See application file for complete search history.

(56) References Cited

U.S. PATENT DOCUMENTS 5,768,121 A    6/1998    Federspiel
5,875,109 A *  2/1999   Federspiel ............... F24F 11/62
                                                700/40
(Continued)

FOREIGN PATENT DOCUMENTS

EP    1 156 286 A2    11/2001
EP    2 636 959 A1     9/2013
(Continued)

OTHER PUBLICATIONS

International Search Report and Written Opinion on International Patent Application No. PCT/US2018/063111 dated May 21, 2019. 20 pages.

(Continued)

*Primary Examiner* — Kenneth M Lo
*Assistant Examiner* — Tameem D Siddiquee
(74) *Attorney, Agent, or Firm* — Foley & Lardner LLP

(57) ABSTRACT

A system that modifies an environmental condition of a building zone is provided. The system includes an airside processing circuit and a waterside processing circuit. The airside processing circuit drives a damper actuator to a first setpoint based on an air flow rate setpoint and a first pressure measurement, receives an air flow error signal based on the air flow rate setpoint and a second pressure measurement, determines a setpoint based on the air flow error signal, and drives the damper actuator to the second setpoint. The waterside processing circuit drives a valve actuator to a first setpoint based on a fluid flow rate setpoint and a first flow rate measurement, receives a fluid flow error signal based on the fluid flow rate setpoint and a second flow rate measurement, determines a second setpoint based on the fluid flow error signal, and drives the valve actuator to the second setpoint.

22 Claims, 13 Drawing Sheets

(51) Int. Cl.
  *F24F 11/84*   (2018.01)
  *F24F 11/89*   (2018.01)
  *G05B 13/02*   (2006.01)
  *F24F 11/65*   (2018.01)
  *F24F 110/30*  (2018.01)
  *F24F 110/40*  (2018.01)
  *F24F 140/40*  (2018.01)

(52) U.S. Cl.
  CPC ............ *G05B 13/026* (2013.01); *F24F 11/65* (2018.01); *F24F 2110/30* (2018.01); *F24F 2110/40* (2018.01); *F24F 2140/40* (2018.01); *F24F 2221/16* (2013.01)

(56) References Cited

U.S. PATENT DOCUMENTS

| | | | | |
|---|---|---|---|---|
| 6,095,426 | A * | 8/2000 | Ahmed | G05B 11/42 |
| | | | | 236/49.3 |
| 6,352,106 | B1 | 3/2002 | Hartman | |
| 8,825,185 | B2 | 9/2014 | Salsbury | |
| 9,746,199 | B1 * | 8/2017 | Drees | F24F 11/76 |
| 10,290,025 | B1 * | 5/2019 | Howes | G06Q 30/0261 |
| 2003/0055798 | A1 | 3/2003 | Hittle et al. | |
| 2007/0181701 | A1 * | 8/2007 | Cheng | F24F 11/83 |
| | | | | 236/49.3 |
| 2008/0179408 | A1 * | 7/2008 | Seem | F24F 11/0001 |
| | | | | 236/13 |
| 2010/0324962 | A1 * | 12/2010 | Nesler | G06Q 30/0202 |
| | | | | 705/7.36 |
| 2011/0022236 | A1 | 1/2011 | Higgins | |
| 2013/0240172 | A1 | 9/2013 | Reilly et al. | |
| 2014/0065939 | A1 | 3/2014 | Dietz et al. | |
| 2015/0204595 | A1 * | 7/2015 | Sunderland | F25B 25/005 |
| | | | | 165/295 |
| 2017/0295058 | A1 | 10/2017 | Gottschalk et al. | |
| 2018/0299368 | A1 * | 10/2018 | Balchunas | G01N 21/4133 |
| 2019/0063780 | A1 * | 2/2019 | Puttagunta | F24F 12/006 |

FOREIGN PATENT DOCUMENTS

| | | |
|---|---|---|
| WO | WO-2009/103563 A1 | 8/2009 |
| WO | WO-2012/161804 A1 | 11/2012 |
| WO | WO-2013/130956 A1 | 9/2013 |
| WO | WO-2014/108552 A1 | 7/2014 |

OTHER PUBLICATIONS

Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

(56) References Cited

OTHER PUBLICATIONS

Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

State Table

| | OFF - 910 | HEATING - 912 | SATISFIED - 914 | COOLING - 916 |
|---|---|---|---|---|
| Cooling PI - 902 | Override = 0% | Override = 0% | Override = 0% | Auto |
| Air PVDC - 904 | Override = 0% | Auto | Auto | Auto |
| Heating PI - 906 | Override = 0% | Auto | Override = 0% | Override = 0% |
| Water PVDC - 908 | Override = 0% | Auto | Override = 0% | Override = 0% |

HVAC SYSTEM WITH WATERSIDE AND AIRSIDE DISTURBANCE REJECTION

CROSS REFERENCE TO RELATED APPLICATIONS

This application claims the benefit of and priority to U.S. Provisional Patent Application No. 62/592,910 filed Nov. 30, 2017, the entire disclosure of which is incorporated by reference herein in its entirety.

BACKGROUND

The present disclosure relates generally to building management systems and associated devices and more particularly to an HVAC system configured to reject both waterside and airside pressure disturbances.

HVAC actuators are used to operate a wide variety of HVAC components such as air dampers, fluid valves, air handling units, and other components that are typically used in HVAC systems. For example, an actuator can be coupled to a damper, valve, or other movable equipment in a HVAC system and can be used to drive the equipment between an open position and a closed position. An actuator typically includes a motor and a drive device (e.g., a hub, a drive train, etc.) that is driven by the motor and coupled to the HVAC component.

Variable air volume (VAV) units may utilize both damper and valve actuators to control the flow of air past a heat exchanger coil and the amount of fluid flowing through the heat exchanger coil. Controllers for VAV units may utilize one or more feedback control devices to determine and drive the damper and valve actuators to setpoint positions based on building temperature setpoints. It would be useful to increase the capabilities of VAV controller units to operate efficiently even when subjected to waterside and airside system disturbances (e.g., fluctuations in the pressure of air and fluid flow).

SUMMARY

One implementation of the present disclosure is an HVAC system configured to modify an environmental condition of a building zone. The HVAC system includes a damper configured to regulate a supply of air flowing past a heat exchanger coil, a damper actuator coupled to the damper for driving the damper between multiple positions, and an airside processing circuit coupled to the damper actuator. The airside processing circuit is configured to drive the damper actuator to a first damper position setpoint based on an air flow rate setpoint and a first pressure measurement from a pressure sensor, receive an air flow error signal based on the air flow rate setpoint and a second pressure measurement from the pressure sensor, determine a second damper position setpoint based on the air flow error signal, and drive the damper actuator to the second damper position setpoint. The HVAC system further includes a valve configured to regulate a flow of fluid through the heat exchanger coil, a valve actuator coupled to the valve for driving the valve between multiple positions, and a waterside processing circuit coupled to the valve actuator. The waterside processing circuit is configured to drive the valve actuator to a first valve position setpoint based on a fluid flow rate setpoint and a first flow rate measurement from a flow rate sensor, receive a fluid flow error signal based on the fluid flow rate setpoint and a second flow rate measurement from the flow rate sensor, determine a second valve position setpoint based on the fluid flow error signal, and drive the valve actuator to the second valve position setpoint.

In some embodiments, the HVAC system is configured to operate in at least one of a satisfied state, a heating state, and a cooling state.

In some embodiments, the first damper position setpoint permits a minimum supply of air flowing past the heat exchanger coil when the HVAC system is operating in the satisfied state.

In some embodiments, the waterside processing circuit is further configured to override an operation to drive the valve actuator to the first valve position setpoint or the second valve position setpoint when the HVAC system is operating in the satisfied state.

In some embodiments, the waterside processing circuit is further configured to determine a third valve position setpoint based at least in part on a heating fluid flow rate setpoint. The waterside processing circuit receives the heating fluid flow rate setpoint when the HVAC system is operating in the heating state. The waterside processing circuit is further configured to drive the valve actuator to the third valve position setpoint.

In some embodiments, the airside processing circuit is further configured to determine a third damper position setpoint based at least in part on a cooling air flow rate setpoint. The airside processing circuit receives the cooling air flow rate setpoint when the HVAC system is operating in the cooling state. The airside processing circuit is further configured to drive the damper actuator to the third damper position setpoint.

In some embodiments, the waterside processing circuit is further configured to override an operation to drive the valve actuator to the first valve position setpoint or the second valve position setpoint when the HVAC system is operating in the cooling state.

In some embodiments, the HVAC system further comprises a zone temperature sensor disposed in the building zone. In other embodiments, the HVAC system is configured to transition from the satisfied state to the heating state when a zone temperature measurement from the zone temperature sensor is less than a zone temperature heating setpoint for a time period exceeding a transition time threshold. In further embodiments, the HVAC system is configured to transition from the satisfied state to the cooling state when a zone temperature measurement from the zone temperature sensor is greater than zone temperature cooling setpoint for a time period exceeding a transition time threshold.

Another implementation of the present disclosure is a method of operating an HVAC system configured to modify an environmental condition of a building zone. The method includes driving a damper actuator to a first damper position setpoint based on an air flow rate setpoint and a first pressure measurement, driving a valve actuator to a first valve position setpoint based on a fluid flow rate setpoint and a first flow rate measurement, receiving an air flow error signal based on the air flow rate setpoint and a second pressure measurement, and receiving a fluid flow error signal based on the fluid flow rate setpoint and a second flow rate measurement. The system further includes determining a second damper position setpoint based on the air flow error signal, determining a second valve position setpoint based on the fluid flow error signal, driving the damper actuator to the second damper position setpoint, and driving the valve actuator to the second valve position setpoint.

In some embodiments, the HVAC system is configured to operate in at least one of a satisfied state, a heating state, and a cooling state.

In some embodiments, the method includes overriding an operation to drive the valve actuator to the first valve position setpoint or the second valve position setpoint when the HVAC system is operating in the satisfied state.

In some embodiments, the method includes determining a third valve position setpoint based at least in part on a heating fluid flow rate setpoint when the HVAC system is operating in the heating state, and driving the valve actuator to the third valve position setpoint.

In some embodiments, the method includes determining a third damper position setpoint based at least in part on a cooling air flow rate setpoint when the HVAC system is operating in the cooling state and driving the damper actuator to the third damper position setpoint.

In some embodiments, the method includes overriding an operation to drive the valve actuator to the first valve position setpoint or the second valve position setpoint when the HVAC system is operating in the cooling state.

Yet another implementation of the present disclosure is an HVAC system to modify an environmental condition of a building zone. The HVAC system includes a zone temperature sensor disposed in the building zone and a state controller configured to operate an airside control loop and a waterside control loop using a cascaded control method in multiple operational states based at least in part on a zone temperature measurement from the zone temperature sensor. The operational states include a satisfied state, a heating state, and a cooling state.

In some embodiments, the HVAC system is configured to transition operation of the airside control loop and the waterside control loop from the satisfied state to the heating state when the zone temperature measurement from the zone temperature sensor is less than a zone temperature heating setpoint for a first time period exceeding a transition time threshold. In some embodiments, the HVAC system is configured to transition operation of the airside control loop and the waterside control loop from the satisfied state to the cooling state when the zone temperature measurement from the zone temperature sensor is greater than zone temperature cooling setpoint for a second time period exceeding the transition time threshold.

In some embodiments, the state controller is configured to detect a fault condition based on at least one of a number of transitions between the multiple operational states, and a frequency of transitions between the multiple operational states.

In some embodiments, the airside control loop includes a damper configured to regulate a supply of air flowing past a heat exchanger coil, a damper actuator coupled to the damper for driving the damper between multiple positions, and an air flow feedback controller configured to drive the damper actuator to a damper position setpoint based at least in part on the zone temperature measurement and a pressure measurement from a pressure sensor. In some embodiment, the waterside control loop includes a valve configured to regulate a flow of fluid through the heat exchanger coil, a valve actuator coupled to the damper for driving the valve between multiple positions, and a fluid flow feedback controller configured to drive the valve actuator to a valve position setpoint based at least in part on the zone temperature measurement and a flow rate measurement from a flow rate sensor.

DETAILED DESCRIPTION

Overview

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, various HVAC systems with waterside and airside pressure disturbance rejection features are shown, according to some embodiments. The HVAC system may be controlled by a supervisory state controller which operates the system in a variety of operational states including, but not limited to, an off state, a satisfied state, a heating state, and a cooling state. Based on the operational state, the state controller may transmit control signals to components of the HVAC system that override operation of devices (e.g., a valve actuator, a damper actuator) in order to achieve a heating or cooling setpoint. Transitions between states may occur according to criteria stored in a state table.

The state controller may also utilize a cascaded control system. In a cascaded control system, a primary controller generates a control signal that serves as the setpoint for a secondary controller (e.g., the VAV controller). Thus, a cascaded control system contains an outer control loop and an inner control loop. For example, the outer loop (primary) controller may determine an air or fluid flow rate setpoint for the inner loop based on the measured temperature of a building zone. In response, the inner loop (secondary) controller may utilize pressure or fluid flow rate sensor measurements to determine the necessary actuator position setpoint to achieve the flow rate setpoint received from the outer loop. System disturbances may be automatically attenuated by the feedback control action of the inner loop.

Building Management System and HVAC System

Figure 1:
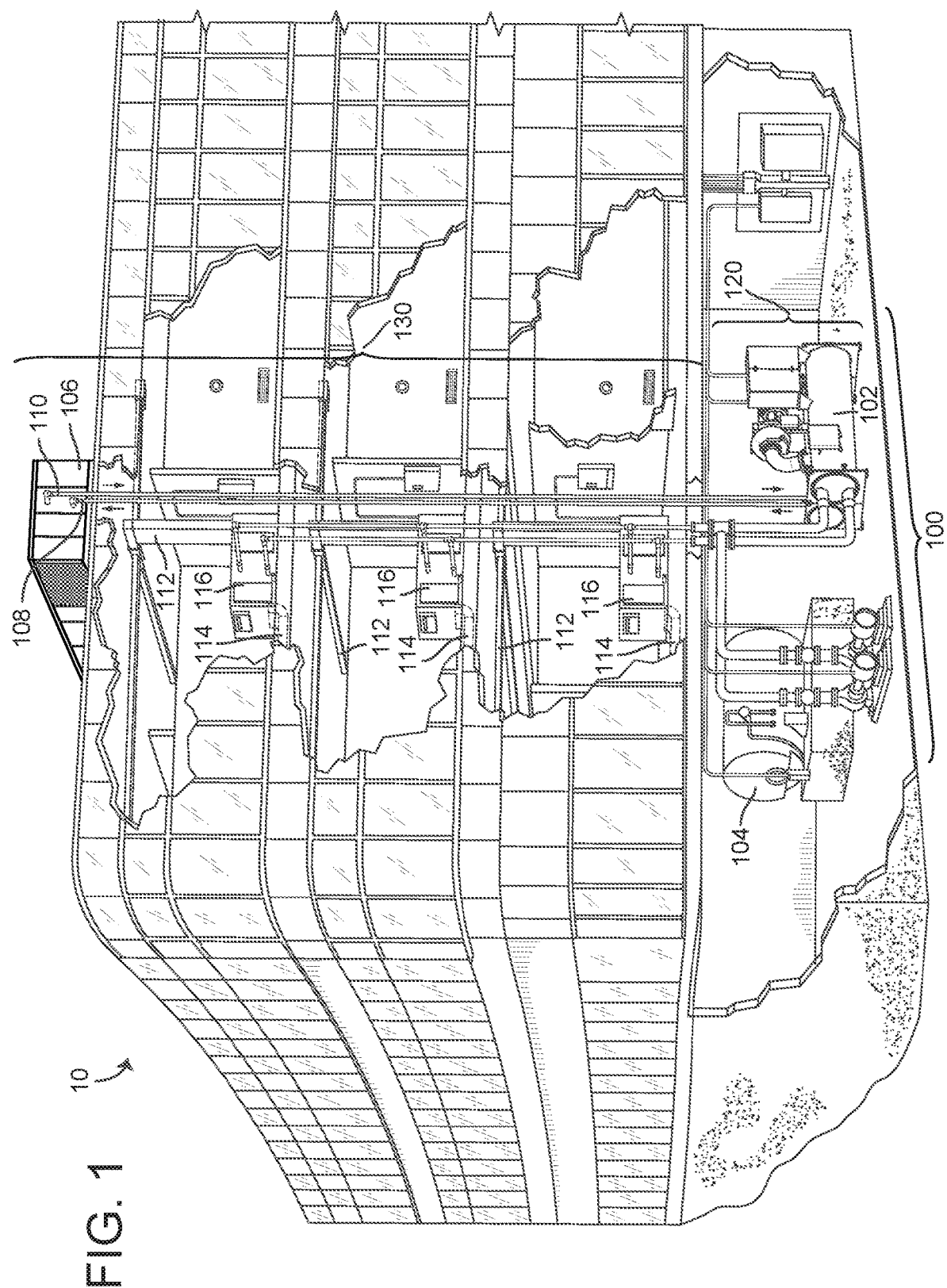
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
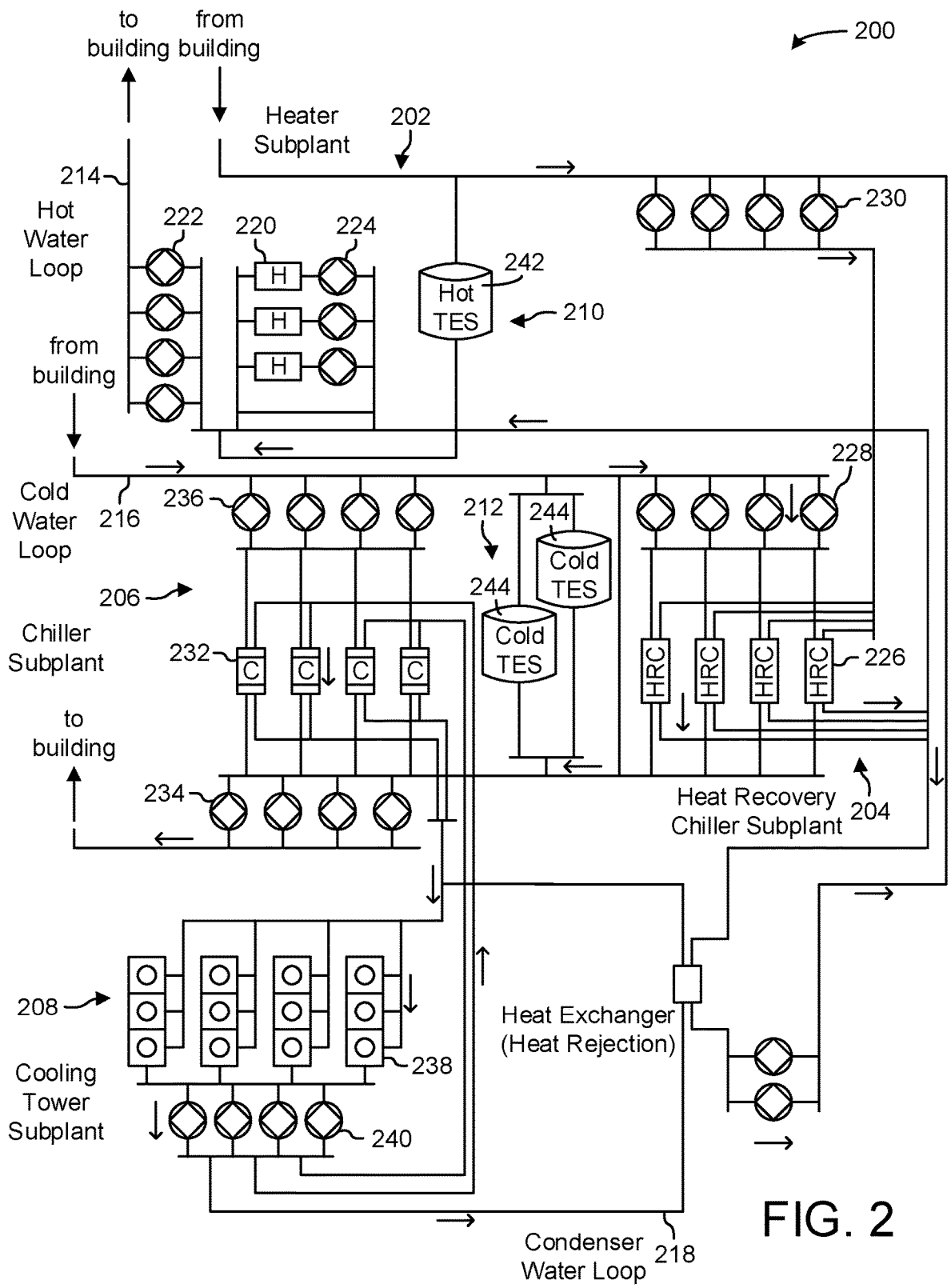
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
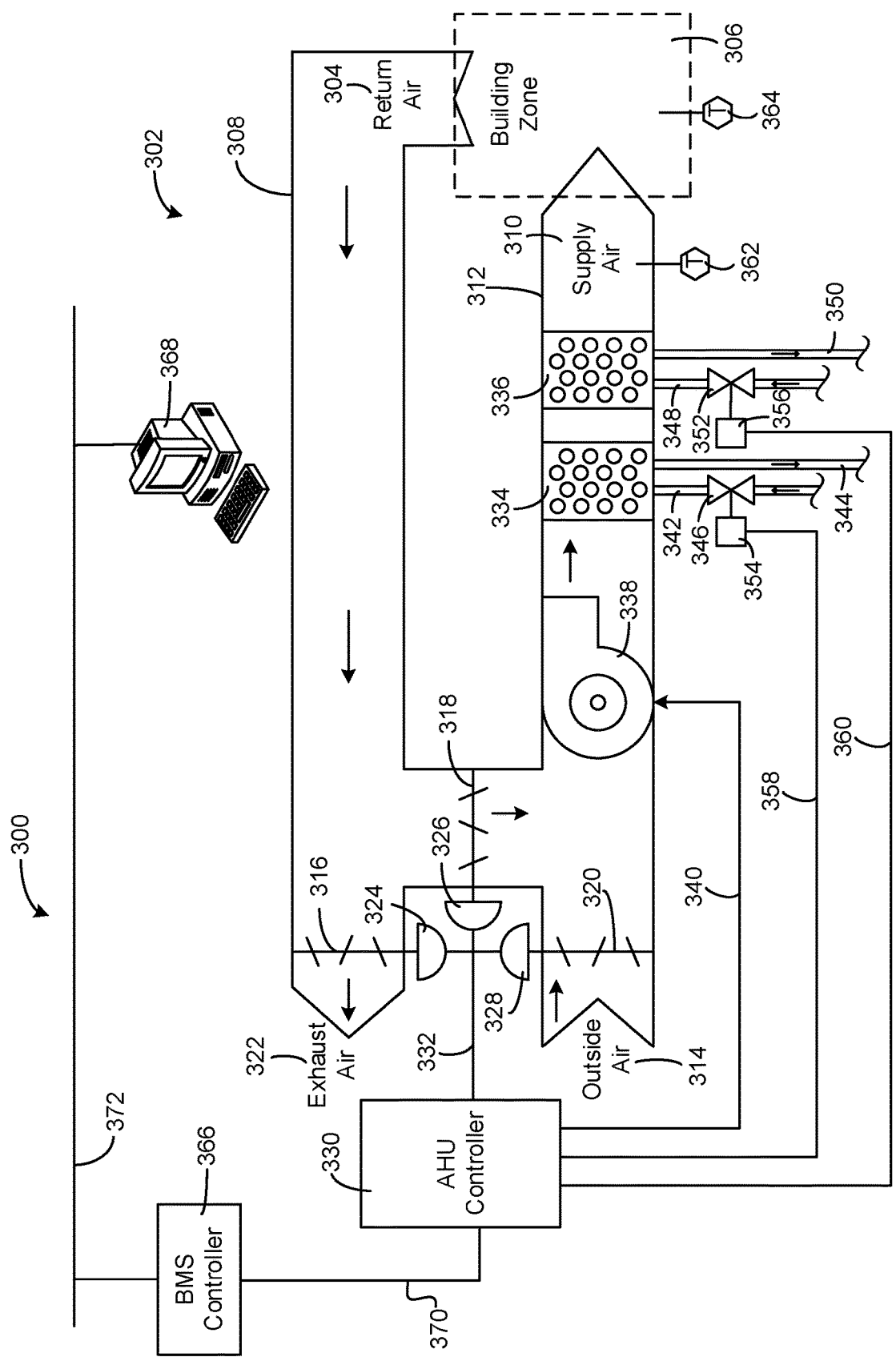
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
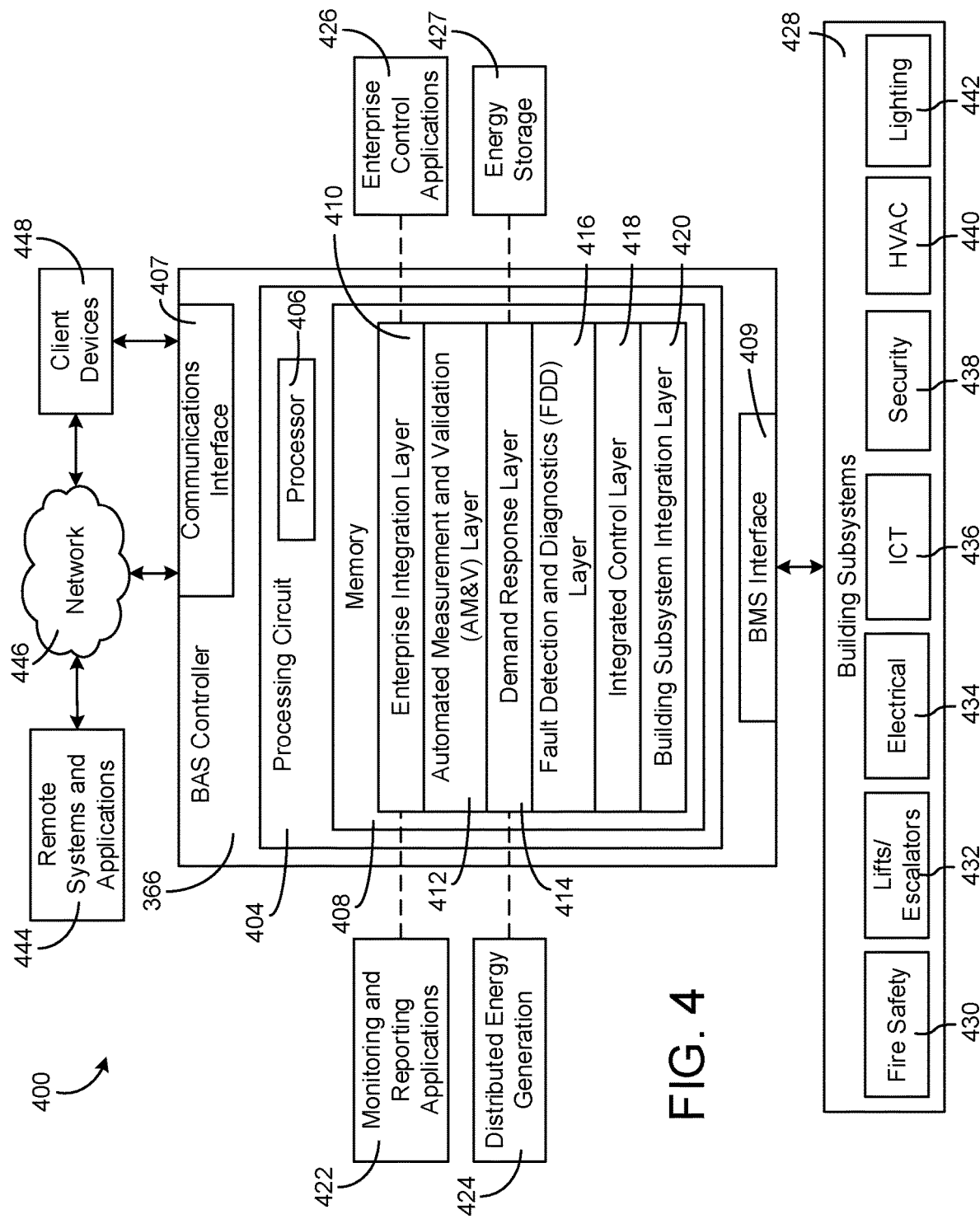
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Variable Air Volume Controller System

Figure 5:
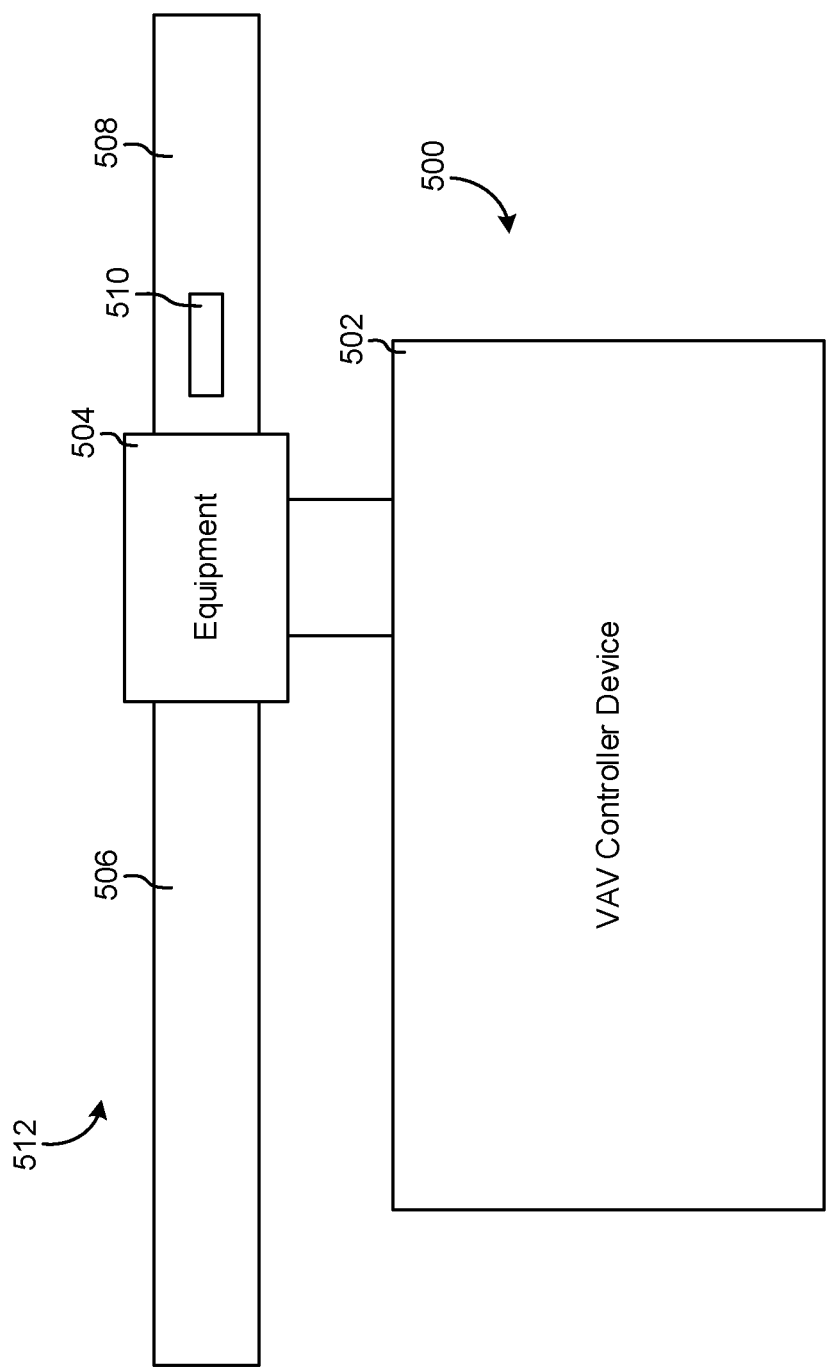
FIG. 5 is a block diagram of a variable air volume (VAV) controller device that can be implemented in the HVAC system of FIG. 1, according to some embodiments.

Referring now to FIG. 5, a block diagram of a variable air volume (VAV) controller system 500 is shown, according to some embodiments. System 500 may be used in HVAC system 100, waterside system 200, airside system 300, or BMS 400, as described with reference to FIGS. 1-4. VAV controller system 500 is shown to include a VAV controller device 502 coupled to equipment 504. In some embodiments, VAV controller device 502 includes one or more actuators. The one or more actuators may be damper actuators, valve actuators, fan actuators, pump actuators, or any other type of actuator that can be used in an HVAC system or BMS. In addition, in various embodiments, the one or more actuators may be linear actuators (e.g., linear proportional actuators), non-linear actuators, spring return actuators, or non-spring return actuators.

Equipment 504 may be any type of control device or devices configured to control an environmental parameter in an HVAC system, including a 2-way or 3-way two position electric motorized valve, a ball isolation valve, a floating point control valve, an adjustable flow control device, or a modulating control valve. In some embodiments, equipment 504 may regulate the flow of fluid through a conduit, pipe, or tube (e.g., conduit 512) in a waterside system (e.g., waterside system 200, shown in FIG. 2). Conduit 512 may include upstream conduit section 506 and downstream conduit section 508. In other embodiments, equipment 504 may be a damper that regulates the flow of air through a duct in an airside system (e.g., airside system 300, shown in FIG. 3).

In some embodiments, VAV controller device 502 and equipment 504 are located within a common integrated device chassis or housing. In short, VAV controller device 502 and equipment 504 may not be packaged as separate devices, but as a single device. Reducing the number of devices in an HVAC system may provide numerous advantages, most notably in time and cost savings during the installation process. Because it is not necessary to install VAV controller device 502 and equipment 504 as separate devices and then make a connection between them, technicians performing the installation may require less specialized training and fewer tools. Other advantages of a single device may include simplification of control and troubleshooting functions. However, in some embodiments, VAV controller device 502 and equipment 504 are packaged as separate devices that may be communicably coupled via a wired or a wireless connection.

Still referring to FIG. 5, sensor 510 is shown to be disposed within downstream conduit section 508. Sensor 510 may be configured to measure the flow rate, velocity, or pressure of fluid (e.g., air, water) passing through conduit 512. Sensor 510 may be any type of device (e.g., ultrasonic detector, paddle-wheel sensor, pitot tube, drag-force flowmeter, pressure transducer) configured to measure flow rate, velocity, or pressure using any applicable sensing method. In some embodiments, sensor 510 is a heated thermistor flow sensor that operates according to the principles of King's Law. According to King's Law, the heat transfer from a heated object exposed to a moving fluid is a function of the velocity of the fluid. King's Law devices have several advantageous features, including very high sensitivity at low flow rates and measurement of the fluid temperature (which may be useful for fault detection and control purposes), although they have decreased sensitivity at high flow rates.

In other embodiments, sensor 510 is a vortex-shedding flowmeter configured to determine the fluid flow rate by calculating the Strouhal number. The Strouhal number is a dimensionless value useful for characterizing oscillating flow dynamics. A vortex-shedding flowmeter measures the flow rate via acoustic detection of vortices in fluid caused when the fluid flows past a cylindrically-shaped obstruction. The vibrating frequency of the vortex shedding is correlated to the flow velocity. Vortex-shedding flowmeters have good sensitivity over a range of flow rates, although they require a minimum flow rate in order to be operational.

In some embodiments, sensor 510 is communicably coupled to VAV controller device 502. For example, sensor 510 may be coupled via wired or wireless connection to VAV controller device 502 for the purpose of transmission of flow rate, velocity, or pressure data signals. In various embodiments, sensor data signals may be used by VAV controller device 502 to determine control operations for equipment 504. In further embodiments, sensor 510 is disposed within equipment 504 (e.g., a valve, a damper) to measure the rate of fluid flow before the fluid exits the valve or the pressure of air exiting a damper. When sensor 510 is located within the valve or damper, sensor 510 may additionally function as a fault detection mechanism for the VAV controller system 500. For example, when debris becomes lodged in valve 504, flow through valve 504 may be significantly reduced. This reduction in flow may occur because the components of the actuator within VAV controller device 502 cannot freely operate valve 504, or because the debris within valve 504 obstructs flow through conduit 512. As another example, if sensor 510 is configured to measure the temperature of the air or water flowing through conduit 512 (e.g., because sensor 510 is a heated thermistor flow sensor, described in greater detail with reference to FIG. 6 below) and an actuator within VAV controller device 502 experiences a failure causing the device to overheat, VAV controller device 502 may be able to detect the failure based on temperature data received from sensor 510.

Figure 6:
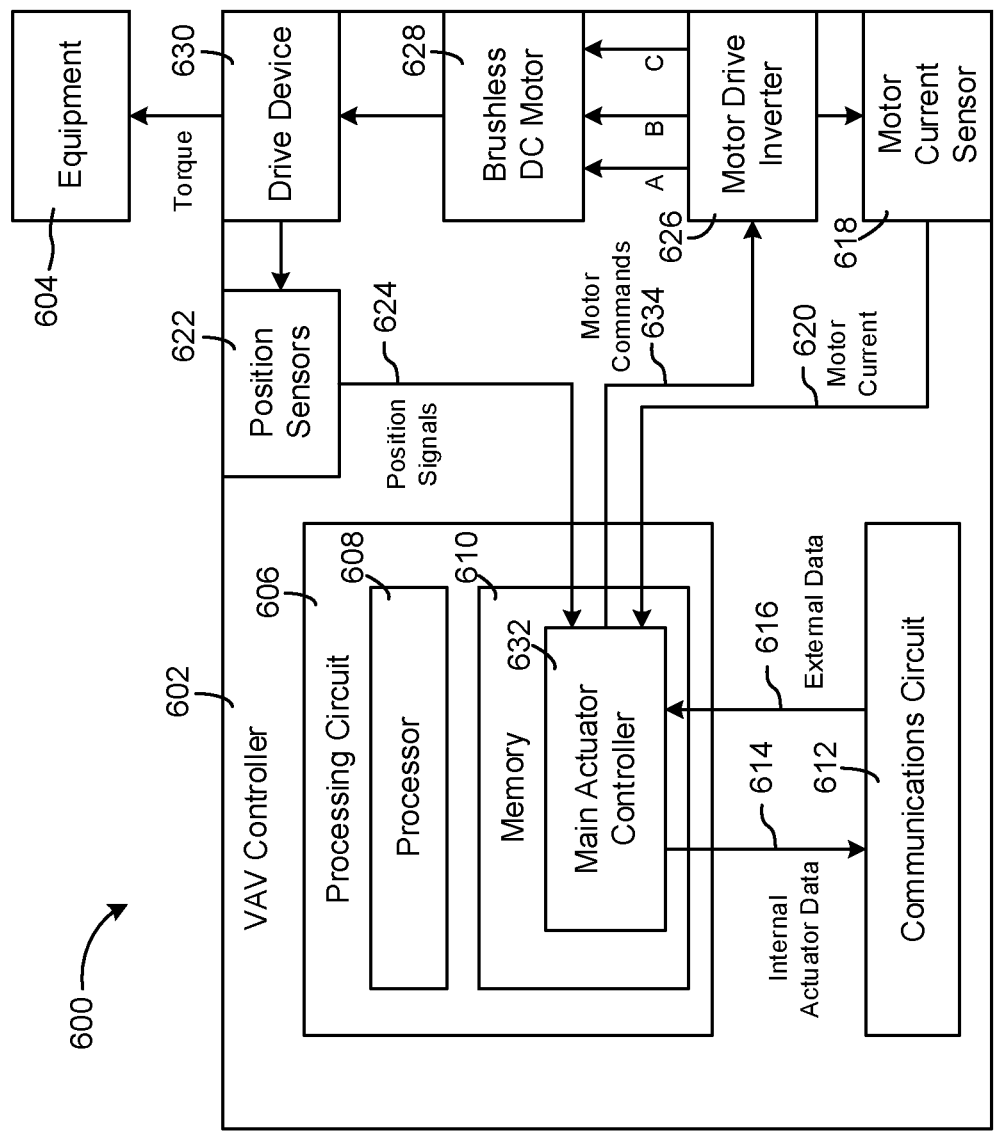
FIG. 6 is a block diagram of another VAV controller device that can be implemented in the HVAC system of FIG. 1, according to some embodiments.

Turning now to FIG. 6, a block diagram of another VAV controller system 600 is shown, according to some embodiments. VAV controller system 600 may be used in HVAC system 100, waterside system 200, airside system 300, or BMS 400, as described with reference to FIGS. 1-4. System 600 may represent a more detailed version of system 500. For example, VAV controller system 600 is shown to include VAV controller device 602, which may be identical or substantially similar to VAV controller device 502 in system 500. VAV controller device 602 may include one or more actuators configured to operate equipment 604. Equipment 604 may include any type of system or device that can be operated by an actuator (e.g., a valve, a damper). In an exemplary embodiment, VAV controller device 602 and equipment 604 (e.g., a valve) are packaged within a common integrated device chassis.

VAV controller device 602 is shown to include a processing circuit 606 communicably coupled to brushless DC (BLDC) motor 628. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 602 (and more particularly processing circuit 606) to complete such activities.

Main actuator controller 632 may be configured to receive external control data 616 (e.g., position setpoints, speed setpoints, etc.) from communications circuit 612 and position signals 624 from position sensors 622. Main actuator controller 632 may be configured to determine the position of BLDC motor 628 and/or drive device 630 based on position signals 624. In some embodiments, main actuator controller 632 receives data from additional sources. For example, motor current sensor 618 may be configured to measure the electric current provided to BLDC motor 628. Motor current sensor 618 may generate a feedback signal indicating the motor current 620 and may provide this signal to main actuator controller 632 within processing circuit 608.

Still referring to FIG. 6, processing circuit 608 may be configured to output a pulse width modulated (PWM) DC motor command 634 to control the speed of the BLDC motor. BLDC motor 628 may be configured to receive a three-phase PWM voltage output (e.g., phase A, phase B, phase C) from motor drive inverter 626. The duty cycle of the PWM voltage output may define the rotational speed of BLDC motor 628 and may be determined by processing circuit 606 (e.g., a microcontroller). Processing circuit 606 may increase the duty cycle of the PWM voltage output to increase the speed of BLDC motor 628 and may decrease the duty cycle of the PWM voltage output to decrease the speed of BLDC motor 628.

BLDC motor 628 may be coupled to drive device 630. Drive device 630 may be a drive mechanism, a hub, or other device configured to drive or effectuate movement of a HVAC system component (e.g., equipment 604). For example, drive device may be configured to receive a shaft of a damper, a valve, or any other movable HVAC system component in order to drive (e.g., rotate) the shaft. In some embodiments, VAV controller device 602 includes a coupling device configured to aid in coupling drive device 630 to the movable HVAC system component. For example, the coupling device may facilitate attaching drive device 630 to a valve or damper shaft.

Position sensors 622 may include Hall effect sensors, potentiometers, optical sensors, or other types of sensors configured to measure the rotational position of BLDC motor 628 and/or drive device 630. Position sensors 622 may provide position signals 624 to processing circuit 606. Main actuator controller 632 may use position signals 624 to determine whether to operate BLDC motor 628. For example, main actuator controller 632 may compare the current position of drive device 630 with a position setpoint received via external data input 616 and may operate BLDC motor 628 to achieve the position setpoint.

VAV controller device 602 is further shown to include a communications circuit 612. Communications circuit 612 may be a wired or wireless communications link and may use any of a variety of disparate communications protocols (e.g., BACnet, LON, WiFi, Bluetooth, NFC, TCP/IP, etc.).

In some embodiments, communications circuit 612 is an integrated circuit, chip, or microcontroller unit (MCU) configured to bridge communications between VAV controller device 602 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using a master/slave token passing (MSTP) protocol. Communications circuit 612 can be added to any existing product to enable BACnet communication with minimal software and hardware design effort. In other words, communications circuit 612 provides a BACnet interface for VAV controller system 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within VAV controller device 602. In some embodiments, communications circuit 612 may receive internal actuator data 614 from main actuator controller 632. For example, internal actuator data 614 may include the sensed motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve, a damper), or any other type of data used or stored internally within VAV controller device 602. In some embodiments, communications circuit 612 may transmit external data 616 to main actuator controller 632. External data 616 may include, for example, position setpoints, speed setpoints, control signals, configuration parameters, end stop locations, stroke length parameters, commissioning data, equipment model data, actuator firmware, actuator software, or any other type of data which can be used by VAV controller device 602 to operate BLDC motor 628 and/or drive device 630.

In some embodiments, external data 616 is a DC voltage control signal. VAV controller device 602 can include a linear proportional actuator configured to control the position of drive device 630 according to the value of the DC voltage received. For example, a minimum input voltage (e.g., 0.0 VDC) may correspond to a minimum rotational position of drive device 630 (e.g., 0 degrees, −5 degrees, etc.), whereas a maximum input voltage (e.g., 10.0 VDC) may correspond to a maximum rotational position of drive device 630 (e.g., 90 degrees, 95 degrees, etc.). Input voltages between the minimum and maximum input voltages may cause VAV controller device 602 to move drive device 630 into an intermediate position between the minimum rotational position and the maximum rotational position. In other embodiments, VAV controller device 602 can include a non-linear actuator or may use different input voltage ranges or a different type of input control signal (e.g., AC voltage or current) to control the position and/or rotational speed of drive device 630.

In some embodiments, external data 616 is an AC voltage control signal. Communications circuit 612 may be configured to transmit an AC voltage signal having a standard power line voltage (e.g., 120 VAC or 230 VAC at 50/60 Hz). The frequency of the voltage signal can be modulated (e.g., by main actuator controller 632) to adjust the rotational position and/or speed of drive device 630. In some embodiments, VAV controller device 602 uses the voltage signal to power various components of actuator 602. VAV controller device 602 may use the AC voltage signal received via communications circuit 612 as a control signal, a source of electric power, or both. In some embodiments, the voltage signal is received from a power supply line that provides VAV controller device 602 with an AC voltage having a constant or substantially constant frequency (e.g., 120 VAC or 230 VAC at 50 Hz or 60 Hz). Communications circuit 612 may include one or more data connections (separate from the power supply line) through which VAV controller device 602 receives control signals from a controller or another actuator (e.g., 0-10 VDC control signals).

Waterside and Airside Disturbance Rejection System

Figure 7:
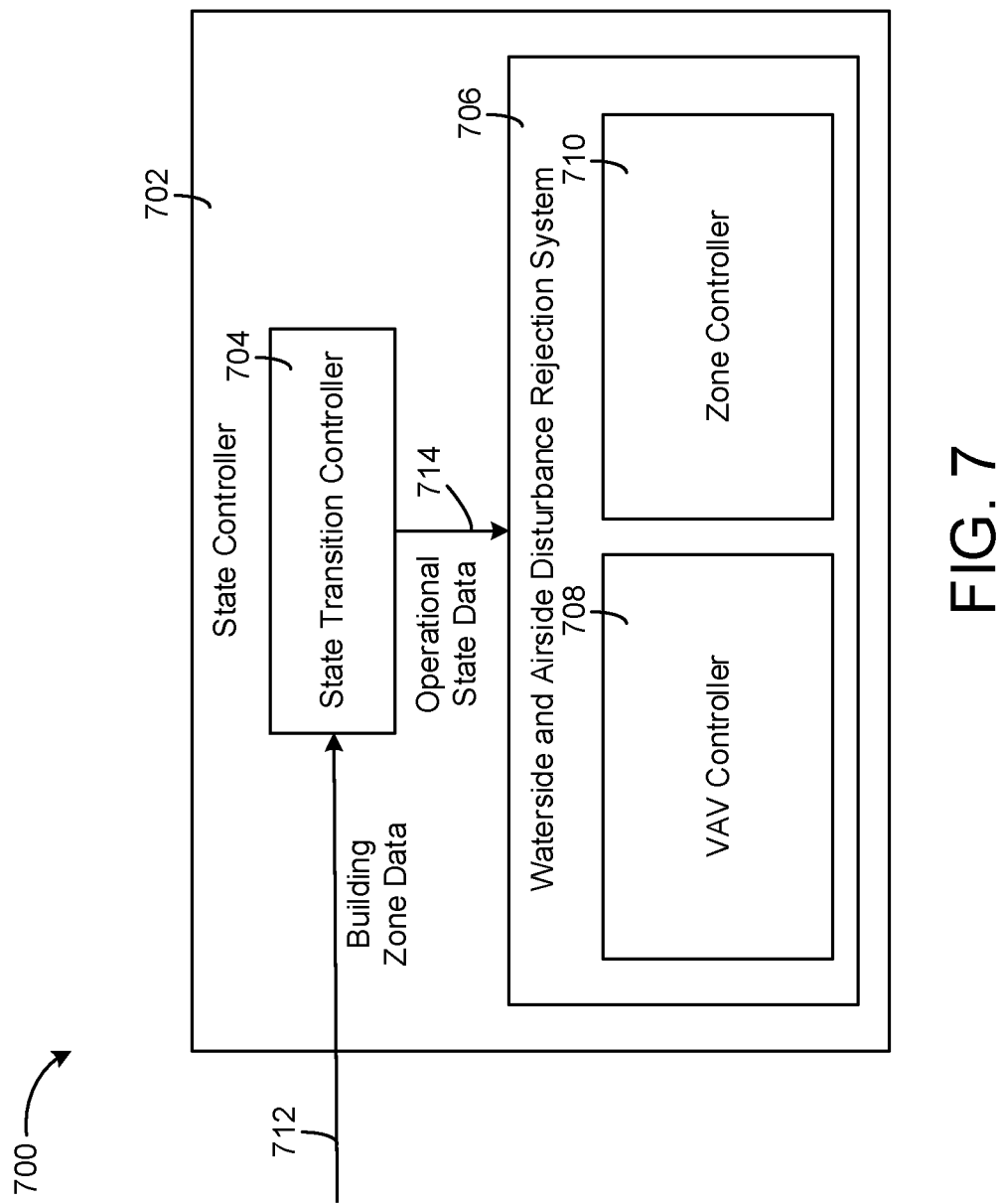
FIG. 7 is a block diagram of a state-controlled waterside and airside disturbance rejection system that can be implemented in the HVAC system of FIG. 1, according to some embodiments.

Turning now to FIG. 7, a block diagram of a state-controlled waterside and airside disturbance rejection system 700 is shown, according to some embodiments. In some embodiments, state-controlled waterside and airside disturbance rejection system 700 is a component or subsystem of HVAC system 100, waterside system 200, airside system 300, or BMS 400, as described above with reference to FIGS. 1-4. System 700 is shown to include, among other components, a state controller 702 with a state transition controller 704 and a waterside and airside disturbance rejection system 706.

State transition controller 704 may be configured to regulate the operational state of the waterside and airside disturbance rejection system 706. For example, as described in further detail below with reference to FIGS. 9 and 10, waterside and airside disturbance rejection system 706 may be operated in multiple operational states. These operational states include, but are not limited to, an "off" state, a "satisfied" state, a "heating" state and a "cooling" state. Based on the operational state of system 700, the state transition controller 704 may transmit operational state data 714 identifying the operational state to waterside and airside disturbance rejection system 706. Identification of the operational state may cause VAV controller 708 and/or zone controller 710 to override operations of various controllers and equipment in order to achieve required heating and/or cooling setpoints.

The state transition controller 704 may determine the operational state of system 700 based on received building zone data 712. In various embodiments, building zone data 712 includes temperature measurements from a temperature sensor disposed within the building zone. State transition controller 704 may use the zone temperature measurements as criteria when determining whether to transition between operational states. In some embodiments, the state transition criteria is codified in a state table (e.g., state table 900, described below with reference to FIG. 9).

In some embodiments, the state transition controller 704 may include fault detection and diagnosis capabilities. In various embodiments, the state transition controller 704 may detect a fault condition based on a number and/or frequency of operational state transitions. For example, state transition controller 704 may detect a fault if the system 700 transitions between a satisfied state and a heating state twenty-five times in one day, or if the system 700 transitions between a satisfied state, a heating state, and a cooling state within the span of an hour. In some embodiments, state transition controller 704 may transmit fault condition data to a supervisory controller (e.g., BAS controller 366, described above with reference to FIGS. 3 and 4) using any suitable wired or wireless method.

Figure 8:
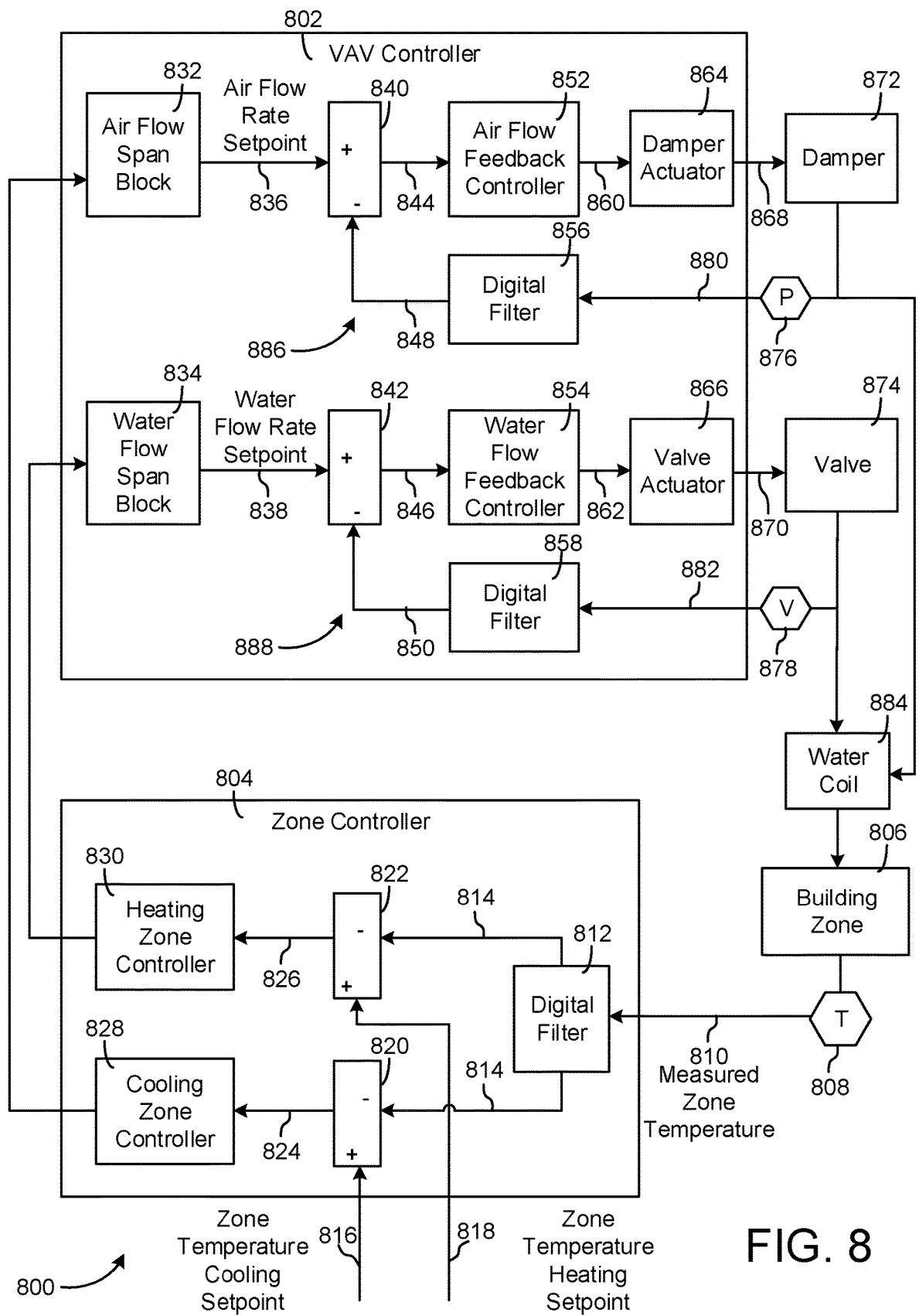
FIG. 8 is a block diagram of a waterside and airside disturbance rejection system that can be implemented in the HVAC system of FIG. 1, according to some embodiments.

Referring now to FIG. 8, a block diagram of a VAV controller device 802 within a waterside and airside disturbance rejection system 800 is shown, according to some embodiments. In a waterside and airside disturbance rejection system, a primary controller (e.g., zone controller 804) generates control signals that serve as air and water flow rate setpoints for secondary controllers (e.g., air flow feedback controller 852, water flow feedback controller 854). The use of a primary controller to generate a setpoint for a secondary controller may be known as a cascaded control system. In some embodiments, the control paths that include the control signal generated by the primary controller may be referred to as "outer loops," while the control paths including the secondary controllers may be referred to as "inner loops." In some embodiments, waterside and airside disturbance rejection system 800 is a component or subsystem of HVAC system 100, waterside system 200, airside system 300, or BMS 400, as described with reference to FIGS. 1-4. Waterside and airside disturbance rejection system 800 may include, among other components, VAV controller device 802, zone controller 804, building zone 806, cooling zone controller 828, heating zone controller 830, damper 872, valve 874, and water coil 884.

In some embodiments, zone controller 804 is a primary controller for the components of an HVAC system (e.g., HVAC system 100) within the outer control loops of waterside and airside disturbance rejection system 800. For example, zone controller 804 may be identical or substantially similar to zone controller 710, described above with reference to FIG. 7. In some embodiments, zone controller 804 is a thermostat or a BMS controller (e.g., for BMS 400). In still further embodiments, controller 804 is a user device configured to run a building management application (e.g., a mobile phone, a tablet, a laptop). Zone controller 804 may receive data from temperature sensor 808. Temperature sensor 808 may be any type of sensor or device configured to measure an environmental condition (e.g., temperature) of a building zone 806. Building zone 806 may be any subsection of a building (e.g., a room, a block of rooms, a floor).

Controller 804 is shown to include a digital filter 812, a cooling setpoint comparator 820, a heating setpoint comparator 822, a cooling zone controller 828, and a heating zone controller 830. Measured zone temperature data 810 from temperature sensor 808 may be received as an input signal to digital filter 812. Digital filter 812 may be configured to convert the measured zone temperature data 810 into a measured zone temperature feedback signal 814 that may be provided as an input to both cooling setpoint comparator 820 and heating setpoint comparator 822. In some embodiments, digital filter 812 is a first order low pass filter. In other embodiments, digital filter 812 may be a low pass filter of a different order or a different type of filter.

Cooling setpoint comparator 820 may be configured to compare the measured zone temperature feedback signal 814 output from digital filter 812 with a zone temperature cooling setpoint value 816. Cooling setpoint comparator 820 may then output a temperature error signal 824 that is received by cooling zone temperature controller 828. Similarly, heating setpoint comparator 822 may be configured to compare the measured zone temperature feedback signal 814 output from digital filter 812 with a zone temperature heating setpoint value 818. Heating setpoint comparator 822 may then output a heating zone temperature error 826 that is received by heating zone temperature controller 830. Comparators 820 and 822 may be discrete electronics parts or implemented as part of zone controller 804.

In various embodiments, cooling zone controller 828 and heating zone controller 830 are pattern recognition adaptive controllers (PRACs), model recognition adaptive controllers (MRACs), or other types of tuning or adaptive feedback controllers. Adaptive control is a control method in which a controller may adapt to a controlled system with associated parameters which vary, or are initially uncertain. In some embodiments, cooling zone controller 828 and/or heating zone controller 830 are similar or identical to the adaptive feedback controller described in U.S. Pat. No. 8,825,185, granted on Sep. 2, 2014, the entirety of which is herein incorporated by reference.

Still referring to FIG. 8, VAV controller device 802 is shown to include both an airside/cooling control loop 886, and a waterside/heating control loop 888. In some embodiments, VAV controller device 802 is identical or substantially similar to VAV controller 708, described above with reference to FIG. 7. The airside control loop 886 includes an air flow span block 832, an air flow setpoint comparator 840, an air flow feedback controller 852, a digital filter 856, and a damper actuator 864. The waterside control loop 888 includes a water flow span block 834, a water flow setpoint comparator 842, a water flow feedback controller 854, a digital filter 858, and a valve actuator 866. Cooling zone temperature error 824 output from cooling setpoint comparator 820 may be transmitted to VAV controller device 802 via cooling zone controller 828. Air flow span block 832 may be configured to enforce allowable maximum and minimum air flow range limits on the received cooling zone temperature error 824. Heating zone temperature error 826 output from heating setpoint comparator 822 may be transmitted to VAV controller device 802 via heating zone controller 830. Water flow span block 834 may be configured to enforce maximum and minimum water flow range limits on the received heating zone temperature error 826. For example, a technician installing the components of waterside and airside disturbance rejection system 800 or an administrator of HVAC system 100 may input maximum and/or minimum air and water flow range limits for the air flow span block 832 and/or the water flow span block 834. In some embodiments, the flow range limits are transmitted via mobile device (e.g., a smart phone, a tablet) and are received via a wireless communications interface of VAV controller device 802. In other embodiments, the flow range limits are transmitted to VAV controller device 802 via a wired network.

In other embodiments, flow limits may be calibrated on-site (e.g., by a water balancer) at the building location. For example, a water balancer may be used to manually adjust the position of valve 874 until a desired maximum and/or minimum flow rate is obtained, as measured by certified equipment. In some embodiments, these limits are subsequently communicated to water flow span block 834. The water balancing technique may be desirable when a high degree of accuracy in flow rate measurement is desired. In still further embodiments, logic within VAV controller device 802 (e.g., air flow feedback controller 852, water flow feedback controller 854) may provide feedback to air flow span block 832 and/or water flow span block 834 to adjust the flow rate limits based on historical operating data.

Referring now to the airside or cooling components of VAV controller device 802, air flow setpoint comparator 840 may be configured to compare the air flow rate setpoint 836 output received from air flow span block 832 to measured air flow rate data. Measured air flow rate data may be received from pressure sensor 876 via digital filter 856. Digital filter 856 is configured to convert the measured air pressure data 880 into an air flow rate feedback signal 848 that may be provided as an input to air flow setpoint comparator 840. In some embodiments, digital filter 856 is a first order low pass filter. In other embodiments, digital filter 856 may be a low pass filter of a different order or a different type of filter.

Air flow setpoint comparator 840 may be a discrete electronics part or implemented as part of air flow feedback controller 852. In some embodiments, air flow setpoint comparator 840 may output an air flow setpoint error signal 844 to air flow feedback controller 852. For example, if air flow setpoint comparator 840 determines that air flow rate setpoint 836 is higher than air flow feedback signal 848, air flow setpoint comparator 840 may generate an air flow setpoint error signal 844 that causes air flow feedback controller 852 to operate damper actuator 864 to increase the flow rate through damper 872. Conversely, if air flow setpoint comparator 840 determines that air flow rate setpoint 836 is lower than air flow rate feedback signal 848, air flow setpoint comparator 840 may generate an air flow setpoint error signal 844 that causes air flow feedback controller 852 to operate damper actuator 864 to decrease the air flow rate through damper 872.

Still referring to FIG. 8, the airside control loop 886 of VAV controller device 802 is further shown to include a pressure sensor 876. Pressure sensor 876 may be any suitable type of pressure sensor or pressure transducer and may be disposed downstream of damper 872. In various embodiments, pressure sensor 876 may be configured to permit the airside components of VAV controller device 802 to reject fluctuations in system characteristics other than pressure. For example, these characteristics may include inlet air temperature, and airside mass flow. Once collected, pressure data 880 from pressure sensor 876 may be provided to digital filter 856 and converted by the digital filter 856 into the air flow feedback signal 848 that is provided to air flow setpoint comparator 840.

Referring now to the waterside control loop 888 of VAV controller device 802, water flow setpoint comparator 842 may compare the water flow rate setpoint 838 output received from water flow span block 834 to measured water flow rate data. Measured water flow rate data may be received from flow sensor 878 via digital filter 858. Digital filter 858 is configured to convert the measured water flow rate data 882 into a water flow rate feedback signal 850 that may be provided as an input to water flow setpoint comparator 842. In some embodiments, digital filter 858 is a first order low pass filter. In other embodiments, digital filter 858 may be a low pass filter of a different order or a different type of filter.

Water flow setpoint comparator 842 may be a discrete electronics part or implemented as part of water flow feedback controller 854. In some embodiments, water flow setpoint comparator 842 may output a water flow setpoint error signal 846 to water flow feedback controller 854. For example, if water flow setpoint comparator 842 determines that water flow setpoint 838 is higher than water flow feedback signal 850, water flow setpoint comparator 842 may generate a water flow setpoint error signal 846 that causes water flow feedback controller 854 to operate valve actuator 866 to increase the flow rate through valve 874. Conversely, if water flow setpoint comparator 842 determines that water flow rate setpoint 838 is lower than water flow rate feedback signal 850, water flow setpoint comparator 842 may generate a water flow setpoint error signal 846 that causes water flow feedback controller 854 to operate valve actuator 866 to decrease the water flow rate through valve 874.

Air flow feedback controller 852 and water flow feedback controller 854 are similarly configured to receive error signals 844 and 846 from comparators 840 and 842 respectively, and to output command signals to damper actuator 864 and valve actuator 866 to drive the error signals to zero. Similar to cooling zone controller 828 and heating zone controller 830, in various embodiments, air flow feedback controller 852 and water flow feedback controller 854 are pattern recognition adaptive controllers (PRACs), model recognition adaptive controllers (MRACs), or another type of tuning or adaptive feedback controllers. In other embodiments, air flow feedback controller 852 and/or water flow feedback controller 854 operate using state machine or proportional-integral-derivative (PID) logic. In some embodiments, air flow feedback controller 852 and/or water flow feedback controller 854 is a proportional variable deadband controller (PVDC). Further details regarding PVDCs are disclosed in U.S. Pat. No. 5,768,121 filed May 24, 1995, and U.S. Pat. No. 5,875,109 filed Jul. 3, 1997, the entire disclosures of which are incorporated by reference herein.

Air flow feedback controller 852 may be configured to output an actuator control signal (e.g., a DC signal, an AC signal) to damper actuator 864, while water flow feedback controller 854 may be configured to output an actuator control signal (e.g., a DC signal, an AC signal) to valve actuator 866. In some embodiments, damper actuator 864 and/or valve actuator 866 are identical or substantially similar to the actuators as described above with reference to FIG. 5. For example, damper actuator 864 and/or valve actuator 866 may be a linear actuator (e.g., a linear proportional actuator), a non-linear actuator, a spring return actuator, or a non-spring return actuator. Damper actuator 864 and/or valve actuator 866 may each include a drive device coupled to damper 872 and valve 874 and configured to rotate a shaft of damper 872 and valve 874, respectively. In some embodiments, valve 874 is identical or substantially similar to the valve described above with reference to FIG. 5. For example, in various embodiments, valve 874 may be a 2-way or 3-way two position electric motorized valve, a ball isolation valve, a floating point control valve, an adjustable flow control device, or a modulating control valve.

Still referring to FIG. 8, waterside and airside disturbance rejection system 800 is further shown to include a pressure sensor 876 as a component of the airside control loop 886 and a flow rate sensor 878 as a component of the waterside control loop 888. In some embodiments, pressure sensor 876 and flow rate sensor 878 are identical or substantially similar to sensor 510 as described above with reference to FIG. 5. For example, in various embodiments, flow rate sensor 878 may be a heated thermistor flow sensor or a vortex-shedding flowmeter. In other embodiments, flow rate sensor 878 may be a different type of flow sensor (e.g., a magnetic flowmeter, an ultrasonic flowmeter). Referring to the airside control loop 886, pressure sensor 876 may be disposed downstream of damper 872 to measure the pressure of air exiting damper 872. Once collected, the air pressure data 880 may be provided to digital filter 856, which is configured to convert the measured air pressure data 880 into an air flow rate feedback signal 848 that may be provided as an input to the air flow setpoint comparator 840. Referring now to the waterside control loop 888, flow rate sensor 878 may be disposed downstream of valve 874 to measure the flow rate of water exiting valve 846. The flow rate data 882 from flow rate sensor 878 may then be provided to digital filter 858 and subsequently, the water flow setpoint comparator 842.

In some embodiments, system 800 is configured to reject pressure fluctuations in both the airside control loop 886 and the waterside control loop 888. In further embodiments, system 800 may be configured to reject fluctuations in system characteristics other than pressure. For example, these characteristics may include inlet water temperature, inlet air temperature, and airside mass flow.

Supply air that passes through damper 872 is configured to flow past water coil 884 before it is delivered to building zone 806. Fluid that passes through valve 874 may flow through water coil 884 as a working fluid. The working fluid is in a heat exchange relationship with the supply air. In some embodiments, damper 872 is used to modulate an amount of cooling in the building zone 806, while valve 874 is used to modulate an amount of heating provided to the supply air for building zone 806. In various embodiments, water coil 884 may be used to achieve a zone setpoint temperature (e.g., cooling setpoint 816, heating setpoint 818) for the supply air of building zone 806 or to maintain the temperature of supply air for building zone 806 within a setpoint temperature range. The positions of both damper 872 and valve 874 may affect the amount of heating or cooling in the system and may correlate with the amount of energy consumed to achieve a desired supply air temperature.

Figure 9:
FIG. 9 is a state table that can be implemented by the waterside and airside disturbance rejection system of FIG. 8, according to some embodiments.

Referring now to FIG. 9, a state table 900 that can be implemented by waterside and airside disturbance rejection system 800 is shown. In various embodiments, cooling zone controller 828 (represented in table 900 as "Cooling PI-902"), heating zone controller 830 (represented as "Heating PI-906"), air flow feedback controller 852 (represented as "Air PVDC-904"), and water flow feedback controller 854 (represented as "Water PVDC-908") may collectively operate as a state machine in one of four operational states. The four operational states may include an "OFF" state 910, a "HEATING" state 912, a "SATISFIED" state 914, and a "COOLING" state 916. Waterside and airside disturbance rejection system 800 may change between operational states according to the logic of a state machine (e.g., state machine 1000, described in detail below with reference to FIG. 10).

When the waterside and airside disturbance rejection system 800 is in the "OFF" state 910, each of the controllers 902, 904, 906, and 908 is in an "Override=0%" state. In other words, when system 800 is in the "OFF" state 910, the controllers 902, 904, 906, and 908 do not operate equipment associated with the controllers (e.g., damper actuator 864, valve actuator 866) such that there is any change in the positions of the equipment. When the system 800 is in the "HEATING" state 912, the cooling zone controller 902 is in the "Override=0%" state. However, the rest of the controllers (i.e., heating zone controller 906, air flow feedback controller 904, and water flow feedback controller 908) are in the "auto" state. In the auto state, heating zone controller 906 may operate to output a dynamic water flow rate setpoint (e.g., setpoint 838) to a water flow setpoint comparator (e.g., comparator 842). Air flow feedback controller 904 and water flow feedback controller 908 may operate equipment (e.g., damper actuator 864, valve actuator 866) to achieve a zone temperature heating setpoint (e.g., setpoint 818).

Still referring to FIG. 9, when system 800 is in the "SATISFIED" state 914, the air flow feedback controller 904 is in the "auto" state. In some embodiments, the air flow feedback controller 904 may operate a damper actuator (e.g., actuator 864) to maintain a zone temperature cooling setpoint (e.g., setpoint 816). For example, the air flow feedback controller 904 may maintain the supply air flow rate at the minimum value (e.g., 30% of the maximum value) governed by an air flow span block (e.g., span block 832). This ensures that occupied spaces are provided with ventilation air when temperature setpoints are satisfied. Meanwhile, the other controllers (i.e., cooling zone controller 902, heating zone controller 906, and water flow feedback controller 908) are in the "Override=0%" state. Finally, when system 800 is in the "COOLING" state 916, the cooling zone controller 902 and air flow feedback controller 904 are in the "auto" state and may operate a damper actuator (e.g., actuator 864) to achieve a zone temperature cooling setpoint (e.g., setpoint 816). Heating zone controller 906 and water flow feedback controller 908 are in the "Override=0%" state.

Figure 10:
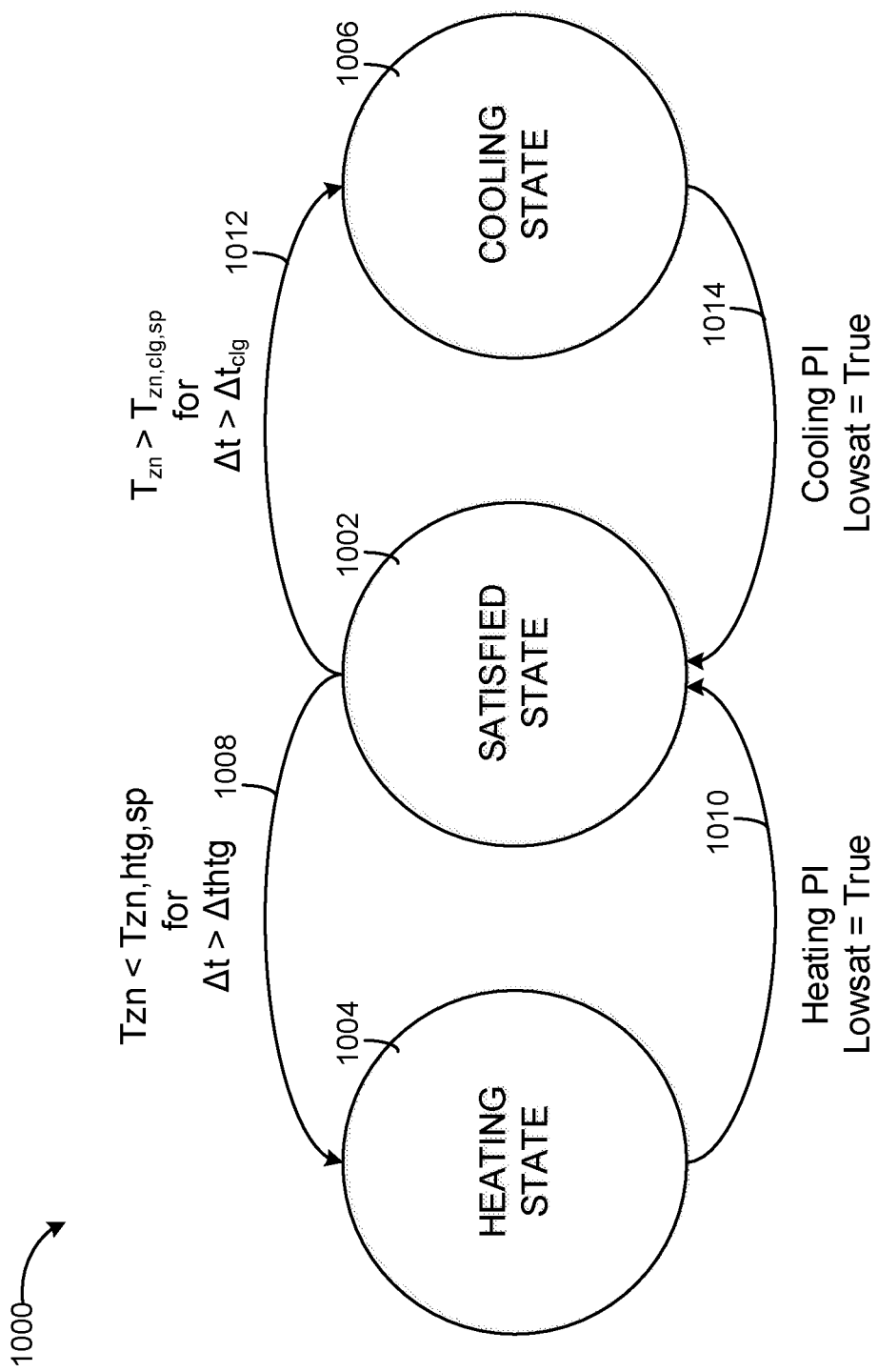
FIG. 10 is a diagram of a state machine that can be implemented in the waterside and airside disturbance rejection system of FIG. 8, according to some embodiments.

Turning now to FIG. 10, a diagram of a state machine 1000 that can be implemented in a waterside and airside disturbance rejection system is shown. In some embodiments, the logic of state machine 1000 may be implemented by cooling zone controller 828, heating zone controller 830, air flow feedback controller 852, and water flow feedback controller 854, described above with reference to FIG. 8. As shown, state machine 1000 includes a "SATISFIED" state 1002, a "HEATING" state 1004, and a "COOLING" state 1006. When system 800 is in the satisfied state 1002, as described above with reference to FIG. 9, air flow feedback controller 852 may operate in the "auto" state, while cooling zone controller 828, heating zone controller 830, and water flow feedback controller 854 may operate in the "Override=0%" state. If the system 800 detects that the temperature of building zone 806 (e.g., as measured by temperature sensor 808) is persistently lower than the setpoint temperature (e.g., zone temperature heating setpoint 818), criterion 1008 is satisfied and system 800 may transition from the satisfied state 1002 to the heating state 1004. In some embodiments, the temperature of building zone 806 must be lower than the setpoint temperature for a specified time period threshold before system 800 may transition to the heating state 1004. Use of a time threshold may prevent unnecessary state transitions when transient conditions occur. Similarly, if the system 800 detects that the temperature of building zone 806 is persistently higher than the setpoint temperature (e.g., zone temperature cooling setpoint 816), criterion 1012 is satisfied and system 800 may transition from the satisfied state 1002 to the cooling state 1006. In some embodiments, the temperature of building zone 806 must be higher than the setpoint temperature for a specified time period threshold before system 800 may transition to the cooling state 1006.

When system 800 is operating in the heating state 1004, as described above with reference to FIG. 9, the cooling zone controller 828 is in the "Override=0%" state, while the rest of the controllers (i.e., heating zone controller 830, air flow feedback controller 852, and water flow feedback controller 854) are in the "auto" state. System 800 may operate in the heating state 1004 until criterion 1010 (e.g., building zone 806 reaches the zone temperature heating setpoint 818 and does not deviate from that setpoint for a specified period of time, "Htg PI Lowsat=True") is satisfied. Once criterion 1010 is satisfied, system 800 returns to operate in the satisfied state 1002.

When system 800 is operating in the cooling state 1006, as described above with reference to FIG. 9, the cooling zone controller 828 and air flow feedback controller 852 are in the "auto" state, while heating zone controller 830 and water flow feedback controller 854 are in the "Override=0%" state. System 800 may operate in the cooling state until criterion 1014 (e.g., building zone 806 reaches the zone temperature cooling setpoint 816 and does not deviate from that setpoint for a specified period of time, "Clg PI Lowsat=True") is satisfied. Once criterion 1014 is satisfied, system 800 returns to operate in the satisfied state 1002.

Figure 11:
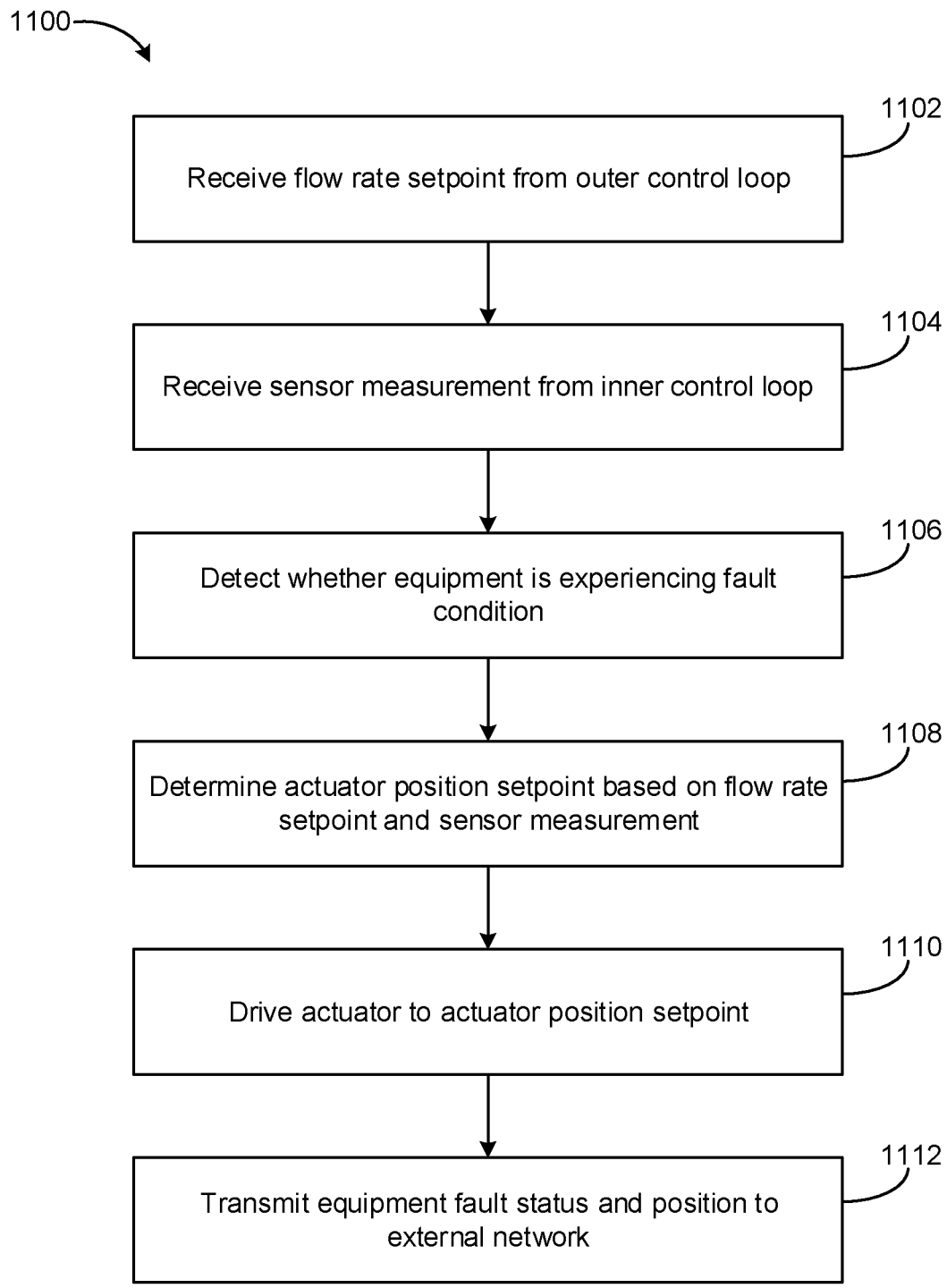
FIG. 11 is a flow diagram of a method of operating a VAV controller device within the waterside and airside disturbance rejection system of FIG. 8, according to some embodiments.

Referring now to FIG. 11, a flow diagram of a process 1100 for operating a VAV controller device within a waterside and airside disturbance rejection system is shown, according to an exemplary embodiment. In various embodiments, process 1100 may be performed by the waterside and airside disturbance rejection system 800 described above with reference to FIG. 8. In some embodiments, process 1100 may be performed continuously, or in response to a dynamic setpoint or measurement. For example, process 1100 may be performed whenever a user modifies zone temperature cooling setpoint 816 or zone temperature heating setpoint 818, or whenever system fluctuations (e.g., pressure fluctuations) result in changes to pressure sensor data 880 or flow sensor data 882.

Process 1100 is shown to include a VAV controller 802 receiving a flow rate setpoint (e.g., air flow rate setpoint 836 or water flow rate setpoint 838) from an outer control loop (step 1102). The flow rate setpoint may be generated through a series of steps in the outer control loop. First, a comparator (e.g., cooling setpoint comparator 820 or heating setpoint comparator 822) of zone controller 804 may compare a zone temperature setpoint (e.g., zone temperature cooling setpoint 816 or zone temperature heating setpoint 818) received from a source external to system 800 (e.g., a supervisory controller, a user mobile device) to measured zone temperature feedback 814 from building zone 806. Based on this comparison, the comparator (e.g., cooling setpoint comparator 820, heating setpoint comparator 822) may generate a zone temperature error signal (e.g., cooling zone temperature error 824 or heating zone temperature error 826) that is received by a zone temperature controller (e.g., cooling zone controller 828 or heating zone controller 830). The zone temperature controller may be configured to generate a flow rate setpoint (e.g., air flow rate setpoint 836, water flow rate setpoint 838) based on the temperature error signal (e.g., cooling zone temperature error 824 and heating zone temperature error 826) and transmit the flow rate setpoint (e.g., air flow rate setpoint 836 or water flow rate setpoint 838) to VAV controller device 802. After verifying that the flow rate setpoint does not exceed a maximum or minimum flow rate limit stored in a flow/velocity span block (e.g., air flow span block 832 or water flow span block 834), the flow rate setpoint may be provided as input to a comparator (e.g., comparator 840 or comparator 842).

Process 1100 is also shown to include VAV controller device 802 receiving a pressure measurement 880 or a flow rate sensor measurement 882 from an inner control loop (e.g., airside control loop 886 or waterside control loop 888) (step 1104). For example, on the cooling side of VAV controller device 802, pressure sensor data 880 measured via pressure sensor 876 is first received at VAV controller device 802 by digital filter 856. In various embodiments, digital filter 856 may be a first order low pass filter, a low pass filter of a different order, or a different type of filter. Digital filter 856 may also be configured to convert pressure sensor data 880 into air flow data. After digital filter 856 converts the measured pressure sensor data 880 to an air flow feedback signal 848, feedback signal 848 is transmitted to comparator 840. On the heating side of VAV controller device 802, flow sensor data 882 measured via flow rate sensor 878 is first received at VAV controller device 802 by digital filter 858. In various embodiments, digital filter 858 may be a first order low pass filter, a low pass filter of a different order, or a different type of filter. After digital filter 858 converts the flow sensor data 882 to a water flow feedback signal 850, feedback signal 850 is transmitted to comparator 842.

Continuing with step 1106 of process 1100, a feedback controller (e.g., air flow feedback controller 852, water flow feedback controller 854) detects whether VAV controller device 802 is experiencing a fault condition. For example, air flow feedback controller 852 may log a fault condition if either damper actuator 864 or damper 872 experiences an electrical or mechanical fault (e.g., signal interruption to damper actuator 864 and/or damper 872, collected debris within damper actuator 864 and/or damper 872). Water flow feedback controller 855 may log a fault condition if either valve actuator 866 or valve 874 experiences an electrical or mechanical fault. A feedback controller may determine the existence of a fault via the measured sensor data (pressure sensor data 880, flow sensor data 882) and/or a flow rate feedback signal (feedback signal 848, feedback signal 850). For example, if either pressure sensor data 880 or flow rate feedback signal 848 indicates that the flow through damper 872 is zero or effectively zero, air flow feedback controller 852 may log a fault condition for VAV controller device 802. Similarly, if either flow sensor data 882 or flow rate feedback signal 850 indicates that the flow through valve 874 is zero or effectively zero, water flow feedback controller 854 may log a fault condition for VAV controller device 802. In some embodiments, the existence of a fault may be expressed as a binary signal (e.g., 0 for no fault detected, 1 for fault detected).

In some instances, it may not be possible to determine the source of the detected fault in step 1106 (e.g., it may be very difficult or costly to determine whether the root cause of a detected fault is in a sensor sensing the conditions caused by an actuator or in the actuator itself). In any case, if a fault is detected, airside/cooling loop 886 and waterside/heating control loop 888 may be bypassed. For example, in one embodiment, cooling zone controller 828 may bypass air flow feedback controller 852 to control damper actuator 864 directly. In another embodiment, heating zone controller 830 may bypass water flow feedback controller 854 to control valve actuator 866 directly. This bypass action may be known as a "fault tolerant" control response.

At step 1108, a feedback controller (e.g., air flow feedback controller 852, water flow feedback controller 854) determines an actuator position setpoint based on the flow rate error signal (e.g., air flow setpoint error signal 844, water flow setpoint error signal 846) received from a comparator (e.g., comparator 840, comparator 842). In some embodiments, as described above, the flow rate error signal is determined by the comparator based on a comparison between the flow rate setpoint (e.g., air flow rate setpoint 836, water flow rate setpoint 838) and the flow rate feedback (e.g., air flow setpoint error signal 844, water flow setpoint error signal 846). The actuator position setpoint determined by the feedback controller may be expressed in a variety of ways, including number of degrees of rotation of a drive device relative to a fixed position (e.g., a zero location, a mechanical end stop, etc.) a number of revolutions of the motor, a number of Hall sensor counts, etc.

Process 1100 continues with step 1110, in which VAV controller device 802 drives the actuator (e.g., damper actuator 864, valve actuator 866) to the actuator position setpoint. In some embodiments, the feedback controller (e.g., air flow feedback controller 852, water flow feedback controller 854) may transmit an actuator position control signal (e.g., a DC voltage, an AC voltage) to the actuator. As described above with reference to FIG. 8, the actuator may be coupled to the damper 872 or the valve 874 via a drive device, and thus a change in the position of the actuator may effect a change in the position of the damper 872 or the valve 874. A change in the position of damper 872 or valve 874 results in a corresponding change in flow rate of the fluid (e.g., air, water) passing through damper 872 or valve 874.

Process 1100 concludes with step 1112, in which VAV controller device 802 transmits data regarding the VAV controller device 802 to an external device or network. In some embodiments, this data may include fault condition statuses and actuator position setpoints of device 802. For example, if a flow feedback controller (e.g., air flow feedback controller 852, water flow feedback controller 854) logged a fault condition in step 1206, a communications interface of VAV controller 802 may transmit a status message indicating the presence of a fault condition at step 1112. Similarly, the communications interface may transmit actuator position messages based on the position setpoints determined at step 1108. Transmission of fault status and position data to external devices and/or networks may be useful in directing technicians to devices that require servicing. Transmission of device data may also be necessary or helpful in optimizing a system pressure setpoint value, described in greater detail below with reference to FIG. 13.

Pump and Fan Pressure Setpoint Optimization System

Figure 12:
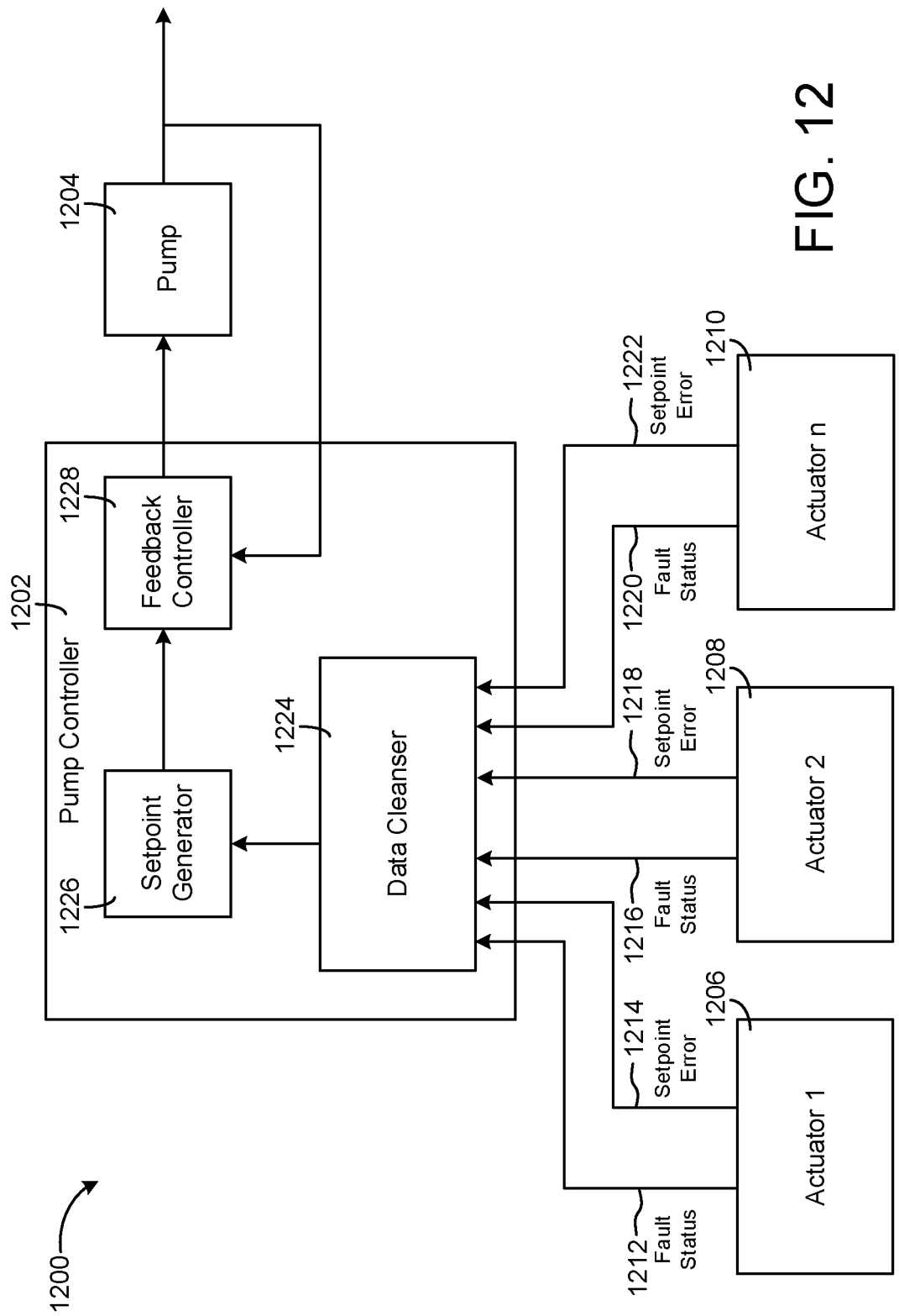
FIG. 12 is a block diagram of a pump pressure setpoint optimization system that can be implemented in the HVAC system of FIG. 1, according to some embodiments.

Referring now to FIG. 12, a block diagram of a pump pressure setpoint optimization system 1200 is shown. In some embodiments, pump pressure setpoint optimization system 1200 is a subsystem of HVAC system 100. Pump pressure setpoint optimization system 1200 is shown to include controller 1202, pump 1204, and a plurality of VAV control devices, here represented as actuators 1206, 1208, and 1210. In various embodiments, actuators 1206-1210 may be identical or substantially similar to valve actuator 866, described above with reference to FIG. 8. Pump 1204 may be any type of device configured to supply force that moves fluid through HVAC system 100. For example, in some embodiments, pump 1204 is a variable speed pump. In another embodiment, system 1200 is a fan pressure setpoint optimization system. In this embodiment, actuators 1206-1210 may be identical or substantially similar to damper actuator 864, described above with reference to FIG. 8, and fan 1204 may be any type of device configured to supply force that moves air through HVAC system 100.

Pump controller 1202 may be a device configured to receive data signals from actuators 1206-1210. Based on the data signals, pump controller 1202 may be configured to transmit a pump control signal to pump 1204. In another embodiment, controller 1202 is a fan controller configured to transmit a fan control signal to fan 1204. In some embodiments, controller 1202 includes a data cleanser 1224, a setpoint generator 1226, and a feedback controller 1228.

Data cleanser 1224 may be a processing circuit configured to receive and classify data transmitted by actuator devices 1206-1210. The data classification performed by data cleanser 1224 may include classifying the device data as "in zone" or "out of zone." This process is described in greater detail below with reference to step 1304 of process 1300. Data cleanser 1224 may be further configured to transmit data classified as in zone to setpoint generator 1226. In some embodiments, setpoint generator 1226 may be a processing circuit configured to use the data classified as in zone to generate an optimized pressure setpoint value for system 1200. Details regarding the generation of this setpoint value are included below with reference to step 1308 of process 1300.

Feedback controller 1228 may be configured to receive an optimized pressure setpoint value from setpoint generator 1226. Feedback controller 1228 may be further configured to receive pressure measurement data from a pressure sensor disposed downstream of pump or fan 1204. Based on the optimized setpoint value and the pressure measurement feedback, feedback controller 1228 may output a control signal to pump or fan 1204. The control signal may be generated by feedback controller 1228 through the use of one or more feedback control algorithms (e.g., state-based algorithms, extremum seeking control (ESC), proportional-integral (PI) control algorithms, proportional-integral-derivative (PID) control algorithms, model predictive control (MPC) algorithms, etc.). For example, if the pressure sensor reading downstream of pump or fan 1204 indicates the system pressure is below the optimized pressure setpoint value, feedback controller 1228 can provide a control signal to pump or fan 1204 to increase the system pressure.

Still referring to FIG. 12, each of the actuator devices 1206-1210 may transmit a fault status 1212, 1216, and 1220, and a setpoint error 1214, 1218, and 1222 to controller 1202. In some embodiments, fault statuses 1212, 1216, and 1220 may be transmitted to data cleanser 1224 as binary data (e.g., 0 for no fault, 1 for fault). In various embodiments, setpoint error 1214, 1218, and 1222 may also be transmitted to data cleanser 1224. Setpoint error 1214, 1218, and 1222 may be transmitted to data cleanser 1224 in the form of a differential value of degrees Celsius, degrees Fahrenheit, or a flow rate (e.g., cubic feet per minute, gallons per minute). In still further embodiments, the positions of actuator devices 1206-1210 may be transmitted to data cleanser 1224 in various forms, including a number of degrees of rotation of a drive device relative to a fixed position (e.g., a zero location, a mechanical end stop, etc.) a number of revolutions of the motor, a number of Hall sensor counts, etc.

Figure 13:
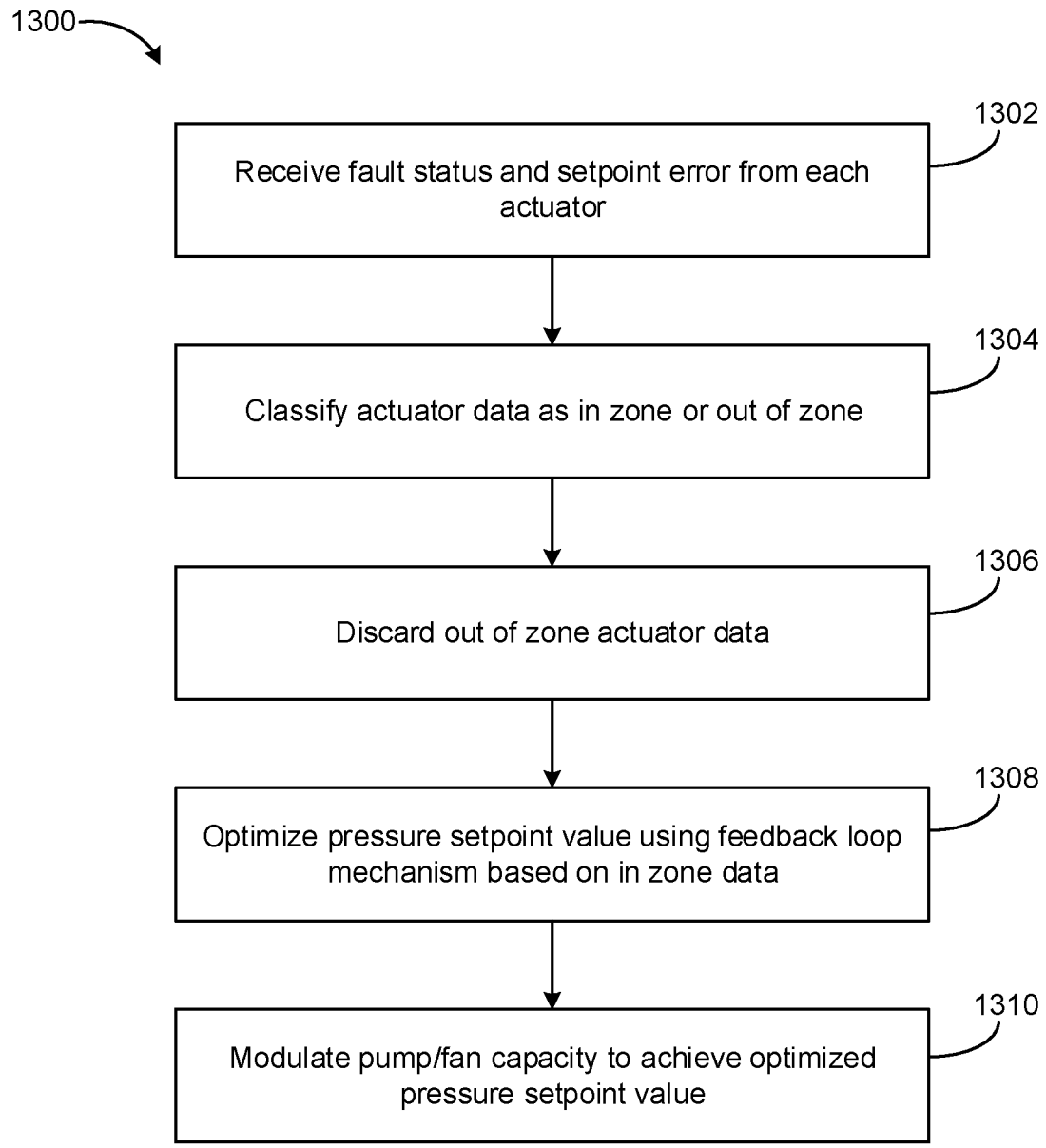
FIG. 13 is a flow diagram of a method of optimizing a pump pressure setpoint using the system of FIG. 12, according to some embodiments.

Referring now to FIG. 13, a flow chart of a process 1300 for optimizing a pressure setpoint is shown, according to some embodiments. In some embodiments, process 1300 may be performed by one or more components of the pressure setpoint optimization system 1200 described above with reference to FIG. 12. For example, in one embodiment, process 1300 is configured to optimize a pump pressure setpoint. In another embodiment, process 1300 is configured to optimize a fan pressure setpoint. For the purposes of simplicity, process 1300 will be described below exclusively with reference to the optimization of a pump pressure setpoint. Process 1300 begins at step 1302, in which data cleanser 1224 receives fault statuses 1212, 1216, and 1220 and setpoint errors 1214, 1218, and 1222 from actuator devices 1206, 1208, and 1210. In some embodiments, fault status may be communicated to data cleanser 1224 as binary data (e.g., 0 for no fault, 1 for fault). The setpoint error signals may be communicated to data cleanser 1224 as a differential value in degrees Fahrenheit, degrees Celsius, or a flow rate (e.g., cubic feet per minute, gallons per minute).

Continuing process 1300 with step 1304, data cleanser 1224 may classify the received actuator data as in zone or out of zone. These classifications may be used to ensure that data from a small number of malfunctioning actuator devices does not exert an outsized effect on the system optimization process. For example, data cleanser 1224 may classify all actuator devices 1206-1210 transmitting fault status data indicating a fault as out of zone. In other words, if actuator devices 1206 and 1210 transmit a fault status of 0 (i.e., indicating no fault conditions) and actuator device 1208 transmits a fault status of 1 (i.e., indicating a fault condition), data cleanser 1224 may classify the data from actuator devices 1206 and 1210 as in zone data, while the data from actuator device 1208 may be classified as out of zone.

As another example, data cleanser 1224 may classify all actuator devices 1206-1210 transmitting setpoint error data outside a specified range as out of zone. For example, data cleanser 1224 may utilize a "trimmed mean technique" in which data sufficiently distant from the mean (e.g., data falling at either extreme of a normal distribution) is "trimmed" away from the data under analysis for optimization purposes. If actuator devices 1206, 1208, and 1210 transmit data indicating the persistent temperature setpoint errors are 1° C., 0.5° C., and 8° C. respectively, data cleanser 1224 may classify the data from devices 1206 and 1210 as in zone data based on their distance from the mean, while the data from device 1208 may be classified as out of zone. In some embodiments, data cleanser 1224 may use a variety of statistical techniques (e.g., trimming all data above a set maximum value or below a set minimum value) to classify setpoint error data as out of zone. After all actuator device data has been classified, data cleanser 1224 may discard the out of zone data (step 1306).

Process 1300 then proceeds to step 1308, in which pump controller 1202 optimizes the pressure setpoint value transmitted from setpoint generator 1226 to feedback controller 1228 using data classified as in zone data. In some embodiments, step 1308 is performed by setpoint generator 1226 of pump controller 1202. In some embodiments, optimization of the pressure setpoint is achieved via an integral-only feedback loop control technique. For example, in some embodiments, system 1200 may include a feedback loop in which a fluid pressure sensor downstream of pump 1204 transmits pressure measurements to feedback controller 1228. Process 1300 may utilize any suitable feedback loop control technique. For example, process 1300 may utilize a proportional-integral (PI) feedback control system. In a PI feedback control system, the control system operates such that the control effort is proportional to the integral of the error. In other embodiments, optimization is accomplished via proportional-derivative (PD), proportional-integral-derivative (PID), state-based, extremum seeking control (ESC), or model predictive control (MPC) control techniques.

Process 1300 may conclude at step 1310 by modulating the pump capacity (e.g., the gallons per minute or cubic meters per hour of fluid flowing through the pump) to achieve the optimized pressure setpoint value. In some embodiments, modulating the pump capacity may include modifying the speed at which the pump operates, since there is a positive correlation between pump speed and pump capacity. For example, if the optimized pressure setpoint value is higher than the current pressure value, pump controller 1302 may transmit a signal to the pump that causes the pump speed to increase. Conversely, if the optimized pressure setpoint value is lower than the current pressure value, pump controller 1302 may transmit a signal to the pump that causes the pump speed to decrease.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An HVAC system configured to modify an environmental condition of a building zone, the HVAC system comprising:
   a zone temperature sensor disposed in the building zone; and
   a state controller configured to operate an airside control loop and a waterside control loop using a cascaded control method by switching between a plurality of operational states based at least in part on a zone temperature measurement from the zone temperature sensor;
   wherein the plurality of operational states comprise a satisfied state, a heating state in which the cascaded control method controls a temperature of the building zone by modulating a water flow rate setpoint for the waterside control loop based on the zone temperature measurement, and a cooling state in which the cascaded control method controls the temperature of the building zone by modulating an air flow rate setpoint for the airside control loop based on the zone temperature measurement; and
   the cascaded control method switches between modulating the water flow rate setpoint and the air flow rate setpoint to control the temperature of the building zone depending on whether the state controller is operating in the heating state or the cooling state.

2. The HVAC system of claim 1, wherein the HVAC system is configured to transition operation of the airside control loop and the waterside control loop:
   from the satisfied state to the heating state when the zone temperature measurement from the zone temperature sensor is less than a zone temperature heating setpoint for a first time period exceeding a transition time threshold; and
   from the satisfied state to the cooling state when the zone temperature measurement from the zone temperature sensor is greater than a zone temperature cooling setpoint for a second time period exceeding the transition time threshold.

3. The HVAC system of claim 1, wherein the state controller is configured to detect a fault condition based on at least one of a number of transitions between the plurality of operational states, and a frequency of transitions between the plurality of operational states.

4. The HVAC system of claim 1, wherein:
   the airside control loop comprises:
   a damper configured to regulate a supply of air flowing past a heat exchanger coil,
   a damper actuator coupled to the damper for driving the damper between multiple positions; and
   an air flow feedback controller configured to drive the damper actuator to a damper position setpoint based at least in part on the zone temperature measurement and a pressure measurement from a pressure sensor; and
   the waterside control loop comprises:
   a valve configured to regulate a flow of fluid through the heat exchanger coil,
   a valve actuator coupled to the damper for driving the valve between multiple positions; and
   a fluid flow feedback controller configured to drive the valve actuator to a valve position setpoint based at least in part on the zone temperature measurement and a flow rate measurement from a flow rate sensor.

5. A heating, ventilation, or air conditioning (HVAC) system operable to provide heating or cooling to a building zone, the HVAC system comprising:
   a heat exchanger configured to transfer heat between a water flow through the heat exchanger and an air flow across the heat exchanger;
   one or more controllers configured to reject waterside disturbances and airside disturbances affecting the heating or cooling provided to the building zone by:
   generating both a water flow rate setpoint and an air flow rate setpoint based on a zone temperature setpoint for the building zone;
   rejecting the waterside disturbances by modulating the water flow through the heat exchanger to achieve the water flow rate setpoint in response to detecting water pressure fluctuation that affects a water flow rate or a water pressure of the water flow through the heat exchanger; and
   rejecting the airside disturbances by modulating the air flow across the heat exchanger to achieve the air flow rate setpoint in response to detecting air pressure fluctuation that affects an air flow rate or an air pressure of the air flow across the heat exchanger.

6. The HVAC system of claim 5, wherein the one or more controllers comprise:
   a zone controller configured to generate one or more temperature control signals based on the zone temperature setpoint and a measured temperature of the building zone using a feedback control technique; and
a variable air volume controller configured to convert the one or more temperature control signals into at least one of the water flow rate setpoint or the air flow rate setpoint.

7. The HVAC system of claim 5, wherein the one or more controllers comprise:
a water flow feedback controller configured to reject the waterside disturbances by controlling a valve to drive the water flow through the heat exchanger toward the water flow rate setpoint; and
an air flow feedback controller configured to reject the airside disturbances by controlling a damper to drive the air flow across the heat exchanger toward the air flow rate setpoint.

8. The HVAC system of claim 5, wherein the one or more controllers are configured to transition between operating in:
a first state in which the air flow rate setpoint is modulated to achieve the zone temperature setpoint and the water flow rate setpoint is held at a constant value; and
a second state in which the water flow rate setpoint is modulated to achieve the zone temperature setpoint and the air flow rate setpoint is held at a constant value.

9. The HVAC system of claim 5, wherein the one or more controllers are configured to transition between operating in:
a first state in which the air flow across the heat exchanger is modulated to achieve the air flow rate setpoint and the water flow through the heat exchanger is held at a constant value; and
a second state in which both the air flow across the heat exchanger and the water flow through the heat exchanger are modulated to achieve the zone temperature setpoint.

10. The HVAC system of claim 5, wherein the one or more controllers form a cascaded control system comprising:
one or more outer loop controllers configured to generate the water flow rate setpoint and the air flow rate setpoint; and
one or more inner loop controllers configured to receive the water flow rate setpoint and the air flow rate setpoint as inputs and modulate the water flow through the heat exchanger and the air flow across the heat exchanger to achieve the water flow rate setpoint and the air flow rate setpoint.

11. The HVAC system of claim 5, wherein:
the heating or cooling provided to the building zone is dependent upon both the water flow through the heat exchanger and the air flow across the heat exchanger; and
the one or more controllers are configured to independently reject the waterside disturbances and the airside disturbances.

12. The HVAC system of claim 5, wherein the one or more controllers are configured to enforce allowable water flow rate limits and allowable air flow range limits when generating the water flow rate setpoint and the air flow rate setpoint.

13. A method for operating heating, ventilation, or air conditioning (HVAC) system to provide heating or cooling to a building zone, the method comprising:
transferring heat between a water flow through a heat exchanger and an air flow across the heat exchanger;
generating both a water flow rate setpoint and an air flow rate setpoint based on a zone temperature setpoint for the building zone;
rejecting waterside disturbances affecting the heating or cooling provided to the building zone by modulating the water flow through the heat exchanger to achieve the water flow rate setpoint in response to detecting water pressure fluctuation that affects a water flow rate or a water pressure of the water flow through the heat exchanger; and
rejecting airside disturbances affecting the heating or cooling provided to the building zone by modulating the air flow across the heat exchanger to achieve the air flow rate setpoint in response to detecting air pressure fluctuation that affects an air flow rate or an air pressure of the air flow across the heat exchanger.

14. The method of claim 13, wherein generating the water flow rate setpoint and the air flow rate setpoint comprises:
generating one or more temperature control signals based on the zone temperature setpoint and a measured temperature of the building zone using a feedback control technique; and
converting the one or more temperature control signals into at least one of the water flow rate setpoint or the air flow rate setpoint.

15. The method of claim 13, wherein:
rejecting the waterside disturbances comprises controlling a valve to drive the water flow through the heat exchanger toward the water flow rate setpoint; and
rejecting the airside disturbances comprises controlling a damper to drive the air flow across the heat exchanger toward the air flow rate setpoint.

16. The method of claim 13, comprising transitioning between operating in:
a first state in which the air flow rate setpoint is modulated to achieve the zone temperature setpoint and the water flow rate setpoint is held at a constant value; and
a second state in which the water flow rate setpoint is modulated to achieve the zone temperature setpoint and the air flow rate setpoint is held at a constant value.

17. The method of claim 13, comprising transitioning between operating in:
a first state in which the air flow across the heat exchanger is modulated to achieve the air flow rate setpoint and the water flow through the heat exchanger is held at a constant value; and
a second state in which both the air flow across the heat exchanger and the water flow through the heat exchanger are modulated to achieve the zone temperature setpoint.

18. The method of claim 13, wherein:
the water flow rate setpoint and the air flow rate setpoint are generated by one or more outer loop controllers of a cascaded control system; and
the water flow rate setpoint and the air flow rate setpoint are received as inputs to one or more inner loop controllers of the cascaded control system and used by the one or more inner loop controllers to modulate the water flow through the heat exchanger and the air flow across the heat exchanger to achieve the water flow rate setpoint and the air flow rate setpoint.

19. The method of claim 13, wherein:
the heating or cooling provided to the building zone is dependent upon both the water flow through the heat exchanger and the air flow across the heat exchanger; and
the waterside disturbances and the airside disturbances are independently rejected using separate control processes.

20. The method of claim 13, wherein generating the water flow rate setpoint and the air flow rate setpoint comprises enforcing allowable water flow rate limits and allowable air flow range limits.

21. The HVAC system of claim 1, comprising a heat exchanger configured to transfer heat between a water flow through the heat exchanger and an air flow across the heat exchanger, wherein:
the airside control loop is configured to affect an air flow rate of the air flow across the heat exchanger; and
the waterside control loop is configured to affect a water flow rate of the water flow through the heat exchanger.

22. The HVAC system of claim 1, wherein the state controller is configured to operate the airside control loop and the waterside control loop using the cascaded control method by:
generating both the water flow rate setpoint and the air flow rate setpoint based on a zone temperature setpoint for the building zone;
operating the waterside control loop in accordance with the water flow rate setpoint while operating the airside control loop in accordance with the air flow rate setpoint.

* * * * *